United States Patent
Liu et al.

(10) Patent No.: US 11,729,825 B2
(45) Date of Patent: Aug. 15, 2023

(54) CHANNEL ACCESS ENHANCEMENT FOR NEW RADIO-UNLICENSED

(71) Applicant: QUALCOMM Incorporated, San Diego, CA (US)

(72) Inventors: Chih-Hao Liu, San Diego, CA (US); Yisheng Xue, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 17/083,222

(22) Filed: Oct. 28, 2020

(65) Prior Publication Data
US 2021/0127421 A1  Apr. 29, 2021

Related U.S. Application Data

(60) Provisional application No. 62/927,542, filed on Oct. 29, 2019.

(51) Int. Cl.
*H04W 74/08* (2009.01)
*H04W 72/20* (2023.01)
*H04W 72/23* (2023.01)

(52) U.S. Cl.
CPC ....... *H04W 74/0808* (2013.01); *H04W 72/20* (2023.01); *H04W 72/23* (2023.01); *H04W 74/0833* (2013.01)

(58) Field of Classification Search
None
See application file for complete search history.

(56) References Cited

U.S. PATENT DOCUMENTS

| | | | |
|---|---|---|---|
| 2021/0235493 A1* | 7/2021 | Wu | H04W 72/048 |
| 2022/0039158 A1* | 2/2022 | Awadin | H04W 74/0816 |
| 2022/0174739 A1* | 6/2022 | Kwak | H04W 74/0866 |
| 2022/0183060 A1* | 6/2022 | Li | H04W 72/0453 |

* cited by examiner

*Primary Examiner* — Marcus Smith
(74) *Attorney, Agent, or Firm* — Norton Rose Fulbright LLP

(57) ABSTRACT

Channel access enhancement for new radio-unlicensed (NR-U) operations are disclosed. In attempting access to a shared communication channel, both base stations and user equipments (UEs) may operate similarly to load-based equipment (LBE) devices by performing extended clear channel access (eCCA) operations independently, such that each of the base stations and UEs may independently acquire the channel occupancy time (COT) of the shared communication spectrum.

80 Claims, 10 Drawing Sheets

CHANNEL ACCESS ENHANCEMENT FOR NEW RADIO-UNLICENSED

CROSS-REFERENCE TO RELATED APPLICATIONS

This application claims the benefit of U.S. Provisional Patent Application No. 62/927,542, entitled, "CHANNEL ACCESS ENHANCEMENT FOR NEW RADIO-UNLICENSED," filed on Oct. 29, 2019, which is expressly incorporated by reference herein in its entirety.

BACKGROUND

Field

Aspects of the present disclosure relate generally to wireless communication systems, and more particularly, to channel access enhancement for new radio-unlicensed (NR-U) operations.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the $3^{rd}$ Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes performing, by a user equipment (UE), an extended clear channel assessment (eCCA) for a random eCCA duration on one or more listen before talk (LBT) subbands of a system bandwidth defined within shared communication spectrum, and transmitting, by the UE, uplink transmissions on one or more uplink occasions scheduled within a channel occupancy time (COT) of at least one LBT subband of the one or more LBT subbands, wherein the transmitting is in response to success of the eCCA in the at least one LBT subband.

In an additional aspect of the disclosure, a method of wireless communication includes performing, by a base station, an eCCA for a random eCCA duration on one or more LBT subbands of a system bandwidth defined within shared communication spectrum, scheduling, by the base station, one or more of one or more uplink occasions and one or more downlink occasions within a COT of at least one LBT subband of the one or more LBT subbands, wherein the COT is initiated in response to success of the eCCA in the at least one LBT subband, and transmitting, by the base station, downlink transmissions on the one or more downlink occasions.

In an additional aspect of the disclosure, an apparatus configured for wireless communication includes means for performing, by a UE, an eCCA for a random eCCA duration on one or more LBT subbands of a system bandwidth defined within shared communication spectrum, and transmitting, by the UE, uplink transmissions on one or more uplink occasions scheduled within a COT of at least one LBT subband of the one or more LBT subbands, wherein the transmitting is in response to success of the eCCA in the at least one LBT subband.

In an additional aspect of the disclosure, an apparatus configured for wireless communication includes means for performing, by a base station, an eCCA for a random eCCA duration on one or more LBT subbands of a system bandwidth defined within shared communication spectrum, means for scheduling, by the base station, one or more of one or more uplink occasions and one or more downlink occasions within a COT of at least one LBT subband of the one or more LBT subbands, wherein the COT is initiated in response to success of the eCCA in the at least one LBT subband, and means for transmitting, by the base station, downlink transmissions on the one or more downlink occasions.

In an additional aspect of the disclosure, a non-transitory computer-readable medium having program code recorded thereon. The program code further includes code to perform, by a UE, an eCCA for a random eCCA duration on one or more LBT subbands of a system bandwidth defined within shared communication spectrum, and code to transmit, by the UE, uplink transmissions on one or more uplink occasions scheduled within a COT of at least one LBT subband of the one or more LBT subbands, wherein the transmitting is in response to success of the eCCA in the at least one LBT subband.

In an additional aspect of the disclosure, a non-transitory computer-readable medium having program code recorded thereon. The program code further includes code to perform, by a base station, an eCCA for a random eCCA duration on one or more LBT subbands of a system bandwidth defined within shared communication spectrum, code to schedule, by the base station, one or more of one or more uplink occasions and one or more downlink occasions within a COT of at least one LBT subband of the one or more LBT subbands, wherein the COT is initiated in response to success of the eCCA in the at least one LBT subband, and code to transmit, by the base station, downlink transmissions on the one or more downlink occasions.

In an additional aspect of the disclosure, an apparatus configured for wireless communication is disclosed. The apparatus includes at least one processor, and a memory coupled to the processor. The processor is configured to perform, by a UE, an eCCA for a random eCCA duration on one or more LBT subbands of a system bandwidth defined within shared communication spectrum, and to transmit, by the UE, uplink transmissions on one or more uplink occasions scheduled within a COT of at least one LBT subband of the one or more LBT subbands, wherein the transmitting is in response to success of the eCCA in the at least one LBT subband.

In an additional aspect of the disclosure, an apparatus configured for wireless communication is disclosed. The apparatus includes at least one processor, and a memory coupled to the processor. The processor is configured to perform, by a base station, an eCCA for a random eCCA duration on one or more LBT subbands of a system bandwidth defined within shared communication spectrum, to schedule, by the base station, one or more of one or more uplink occasions and one or more downlink occasions within a COT of at least one LBT subband of the one or more LBT subbands, wherein the COT is initiated in response to success of the eCCA in the at least one LBT subband, and to transmit, by the base station, downlink transmissions on the one or more downlink occasions.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
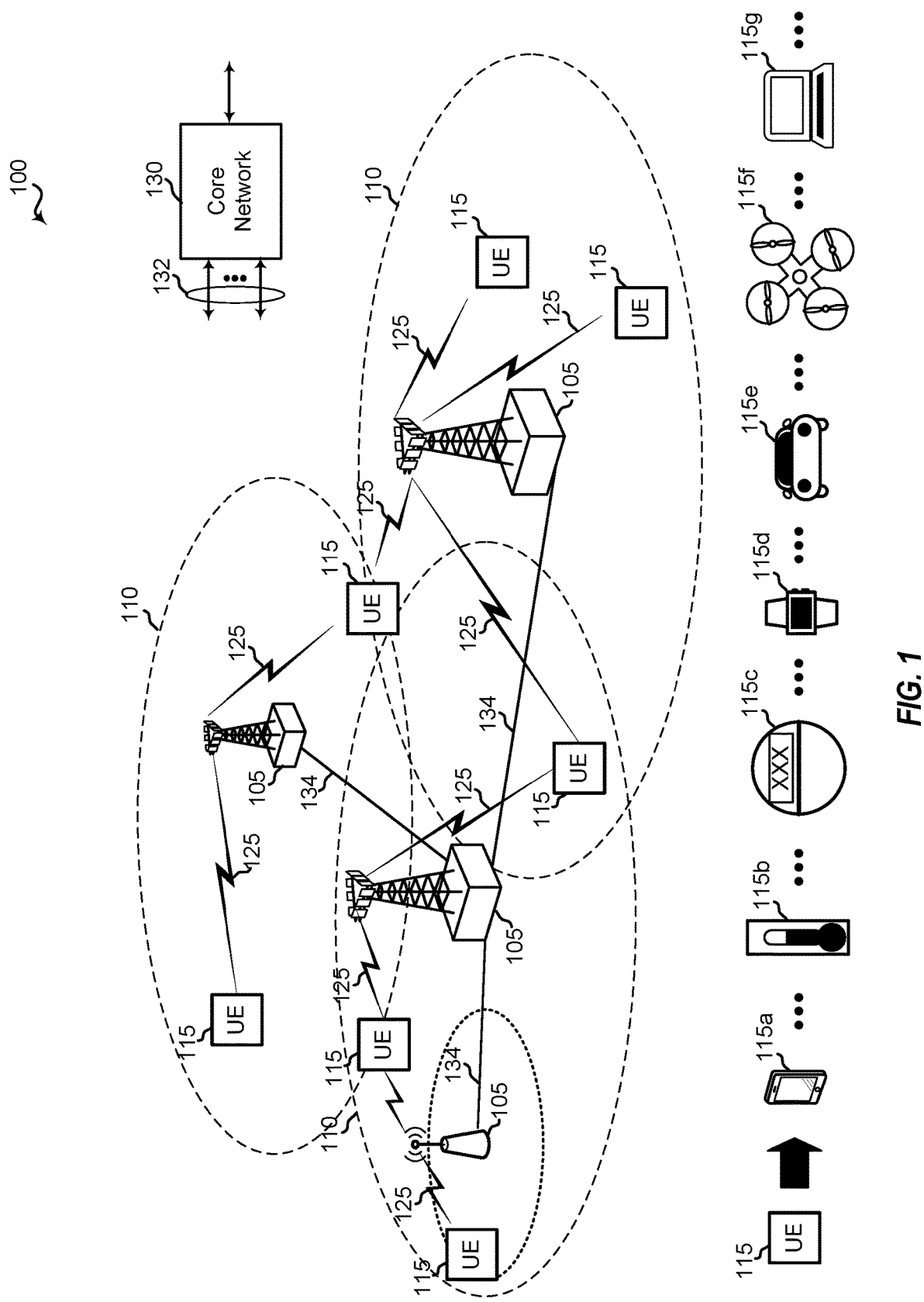
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "$3^{rd}$ Generation Partnership Project" (3GPP), and cdma2000 is described in documents from an organization named "$3^{rd}$ Generation Partnership Project 2" (3GPP2). These various radio technologies and standards are known or are being developed. For example, the $3^{rd}$ Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating an example of a wireless communications system 100 that supports channel access enhancements in NR-U systems, when moving between different NR-U operations, such as when moving between NR-U access at 5 GHz frequencies and 2.4 GHz frequencies, in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or NR or NR-U network. In some cases, wireless communications system 100 may support enhanced broadband communications, ultra-reliable (e.g., mission critical) communications, low latency communications, or communications with low-cost and low-complexity devices. In operations of wireless communications system 100 according to various aspects of the present disclosure, both base stations 105 and UEs 115 may operate similarly to a load-based equipment (LBE) device by performing extended clear channel access (eCCA) operations independently, such that each of base stations 105 and UEs 115 may independently acquire the channel occupancy time (COT) of the shared communication spectrum of wireless communications system 100 operating as an NR-U network. In such operations, the independent access procedures may allow for core network 130 to configure downlink/uplink bandwidth parts (BWPs) of varying size (e.g., ≤20 MHz), or listen before talk (LBT) subband bandwidth. Both overlapping and non-overlapping LBT subbands may further be configured by core network 130 to accommodate access to the shared communication spectrum of wireless communications system 100 by base stations 105 and UEs 115. Core network 130 may further partition each LBT subband, with each subband including configuration for eCCA operation, in order to provide a more dynamic ability to access any clean portions of the shared channels.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be referred to as forward link transmissions while uplink transmissions may also be referred to as reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and, therefore, provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone (UE 115a), a personal digital assistant (PDA), a wearable device (UE 115d), a tablet computer, a laptop computer (UE 115g), or a personal computer. In some examples, a UE 115 may also refer to a wireless local loop (WLL) station, an Internet-of-things (IoT) device, an Internet-of-everything (IoE) device, an MTC device, or the like, which may be implemented in various articles such as appliances, vehicles (UE 115e and UE 115f), meters (UE 115b and UE 115c), or the like.

Some UEs 115, such as MTC or IoT devices, may be low cost or low complexity devices, and may provide for automated communication between machines (e.g., via machine-to-machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In other cases, UEs 115 may be designed to support critical functions (e.g., mission critical functions), and a wireless communications system 100 may be configured to provide ultra-reliable communications for these functions.

In certain cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 may facilitate the scheduling of resources for D2D communications. In other cases, D2D communications may be carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

Wireless communications system 100 may include operations by different network operating entities (e.g., network operators), in which each network operator may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In various implementations, wireless communications system 100 may use both licensed and unlicensed radio frequency spectrum bands. For example, wireless communications system 100 may employ license assisted access (LAA), LTE-unlicensed (LTE-U) radio access technology, or NR technology in an unlicensed band (NR-U), such as the 5 GHz ISM band. In some cases, UE 115 and base station 105 of the wireless communications system 100 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available.

A CCA may include an energy detection procedure to determine whether there are any other active transmissions on the shared channel. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include message detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or shortened (e.g., 18-µs or 25-µs) LBT procedure, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In certain implementations, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In additional cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot, while in other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier," as may be used herein, refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In certain instances, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum, such as NR-shared spectrum (NR-SS)). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In additional cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figure 2:
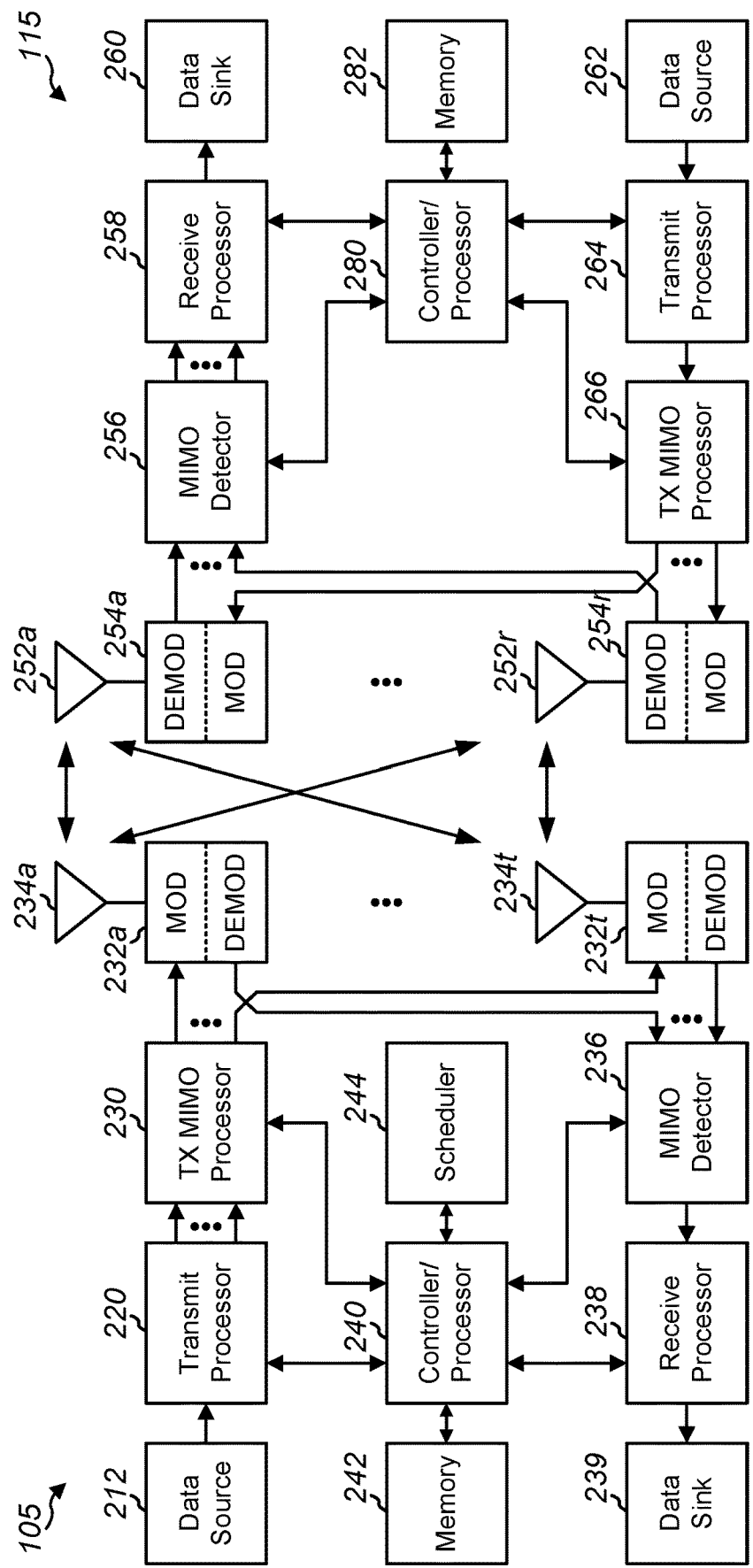
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 3A and 3B, and/or other processes for the techniques described herein. The memories 242 and 282 may store data and program codes for the base station 105 and the UE 115, respectively. A scheduler 244 may schedule UEs for data transmission on the downlink and/or uplink.

For NR-U operations, a wideband-capable UE may be less susceptible to interference compared to a UE that may be limited to a bandwidth capability of less than 20 MHz. 20 MHz has been the typical bandwidth configured for LBT subbands. Wideband-capable UEs can be configured to monitor multiple control resource sets (CORSETs) in a wideband bandwidth part (BWP), which spans over multiple LBT subbands. A base station, such as a eNB or gNB in 5G NR operations, can perform LBT procedures on multiple LBT subbands and schedule wideband-capable UEs on the LBT subbands identified as available on a successful LBT procedure. NR operations, including NR-U, may be available on multiple different frequency ranges. In a first frequency range (FR1) access may occur in sub-6 GHz frequency bands. A second frequency range (FR2) provides for NR-U access in high-frequency bands, such as between 24.25 GHz and 52.6 GHz. Within FR1, there may be different access operations within different frequency bands, such as access to either 5 GHz vs. 2.4 GHz frequency bands. For example, each uplink/downlink BWP in 5 GHz band operations less than or equal to 100 MHz, while each uplink/downlink BWP in 2.4 GHz band operations may be configured at less than or equal to 83.5 MHz.

According to various aspects of the present disclosure, base stations and UEs may both be directed to perform CCA/eCCA independently within an LBT subband of a variable bandwidth less than or equal to 20 MHz. Current regulations do not restrict LBT subband bandwidth to 20 MHz and there are no WiFi backward compatibility issues.

Figure 3B:
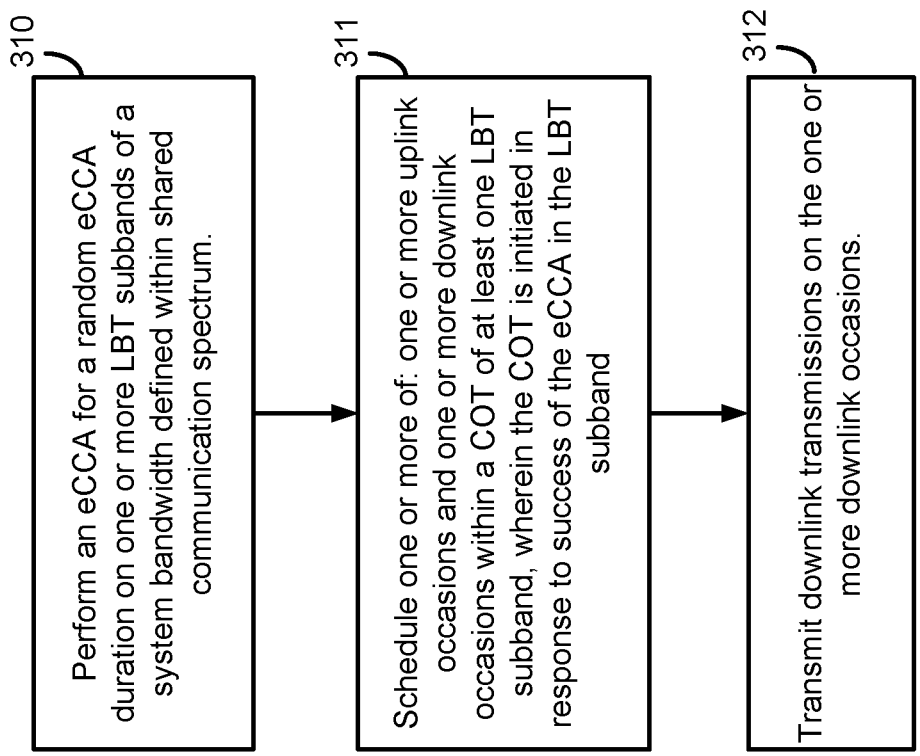
FIGS. 3A and 3B are block diagrams illustrating example blocks executed by a UE to implement one aspect of the present disclosure.
Figure 3A:
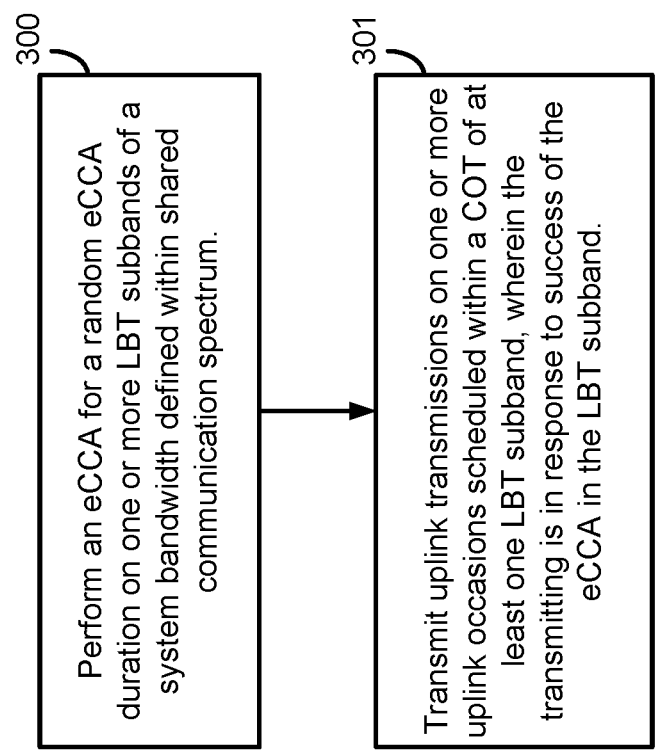
Figure 9:
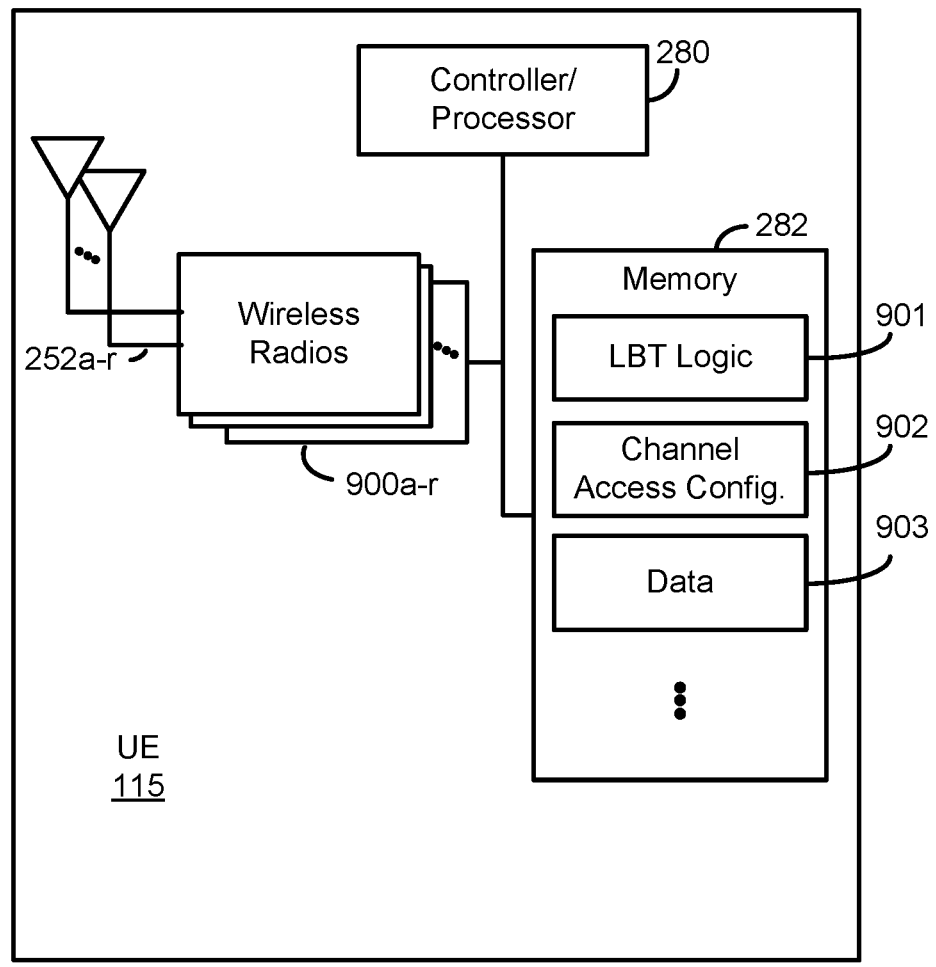
FIG. 9 is a block diagram illustrating a UE configured according to one aspect of the present disclosure.

FIG. 3A is a block diagram illustrating example blocks executed by a UE to implement one aspect of the present disclosure. The example blocks will also be described with respect to UE 115 as illustrated in FIGS. 2 and 9. FIG. 9 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 900a-r and antennas 252a-r. Wireless radios 900a-r includes various components and hardware, as illustrated in FIG. 2 for UE 115, including modulator/demodulators 254a-r, MIMO detector 256, receive processor 258, transmit processor 264, and TX MIMO processor 266.

At block 300, a UE performs an eCCA for a random eCCA duration on one or more LBT subbands of a system bandwidth defined within shared communication spectrum. A UE, such as UE 115, under control of controller/processor 280, executes LBT logic 901, stored in memory 282. The execution environment of LBT logic 901 provides UE 115 with the functionality to perform all LBT procedures, including CCA, eCCA, as well as Cat 1-4 LBT procedures. In determining to access the shared communication channel, UE 115, within the execution environment of LBT logic 901 would begin energy detection for the CCA and eCCA for access in each NR-U LBT subband.

At block 301, the UE transmits uplink transmissions on one or more uplink occasions scheduled within a COT of at least one LBT subband of the one or more LBT subbands, wherein the transmitting is in response to success of the eCCA in the at least one LBT subband. UE 115 may receive scheduling from a serving base station via antennas 252a-r and wireless radios 900a-r. The scheduling may include uplink grant information that allocates specific scheduled uplink occasions or may include configuration for configured uplink occasions where UE 115 may autonomously transmit uplink data, such as data 903, stored in memory 282, via wireless radios 900a-r and antennas 252a-r. UE 115 will transmit data 903 according to the described example aspect in response to detecting a successful eCCA. UE 115 may store such scheduling at channel access configuration 902 in memory 282.

Figure 10:
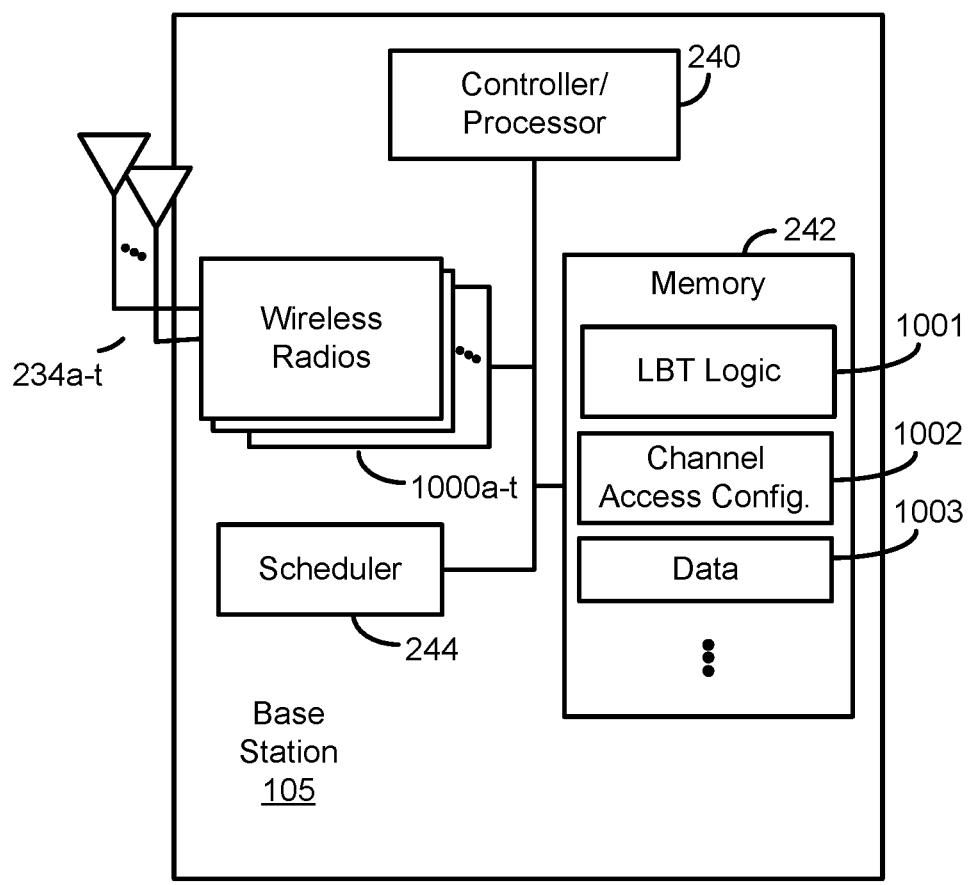
FIG. 10 is a block diagram illustrating a base station configured according to one aspect of the present disclosure.

FIG. 3B is a block diagram illustrating example blocks executed by a base station to implement one aspect of the present disclosure. The example blocks will also be described with respect to base station 105 as illustrated in FIGS. 2 and 10. FIG. 10 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1000a-t and antennas 234a-t. Wireless radios 1000a-t includes various components and hardware, as illustrated in FIG. 2 for base station 105, including modulator/demodulators 232a-t, MIMO detector 236, receive processor 238, transmit processor 220, and TX MIMO processor 230.

At block 310, a base station performs an eCCA for a random eCCA duration on one or more listen before talk (LBT) subbands of a system bandwidth defined within shared communication spectrum. A base station, such as base station 105, under control of controller/processor 240, executes LBT logic 1001, stored in memory 242. As noted above with respect to UE 115, the execution environment of LBT logic 1001 provides base station 105 with the functionality to perform all LBT procedures, including CCA, eCCA, as well as Cat 1-4 LBT procedures. In determining to access the shared communication channel, base station 105, within the execution environment of LBT logic 1001 would begin energy detection for the CCA and eCCA for access in each NR-U LBT subband.

At block 311, the base station schedules one or more of one or more uplink occasions and one or more downlink occasions within a COT of at least one LBT subband of the one or more LBT subbands, wherein the COT is initiated in response to success of the eCCA in the at least one LBT subband. Base station 105, under control of controller/processor 240, operates scheduler 244 to schedule transmission occasions of one or more uplink and/or downlink occasions. Base station 105 may further receive configured uplink configuration information from the network. Base station 105 may then signal the configuration information for the uplink occasions to one or more served UEs.

At block 312, the base station transmits downlink transmissions on the one or more downlink occasions. When downlink occasions are scheduled, base station 105 may, in response to detecting a successful eCCA procedure, may transmit data 1003, stored in memory 242, via wireless radios 1000*a-t* and antennas 234*a-t* according to the scheduled downlink occasions.

Figure 4:
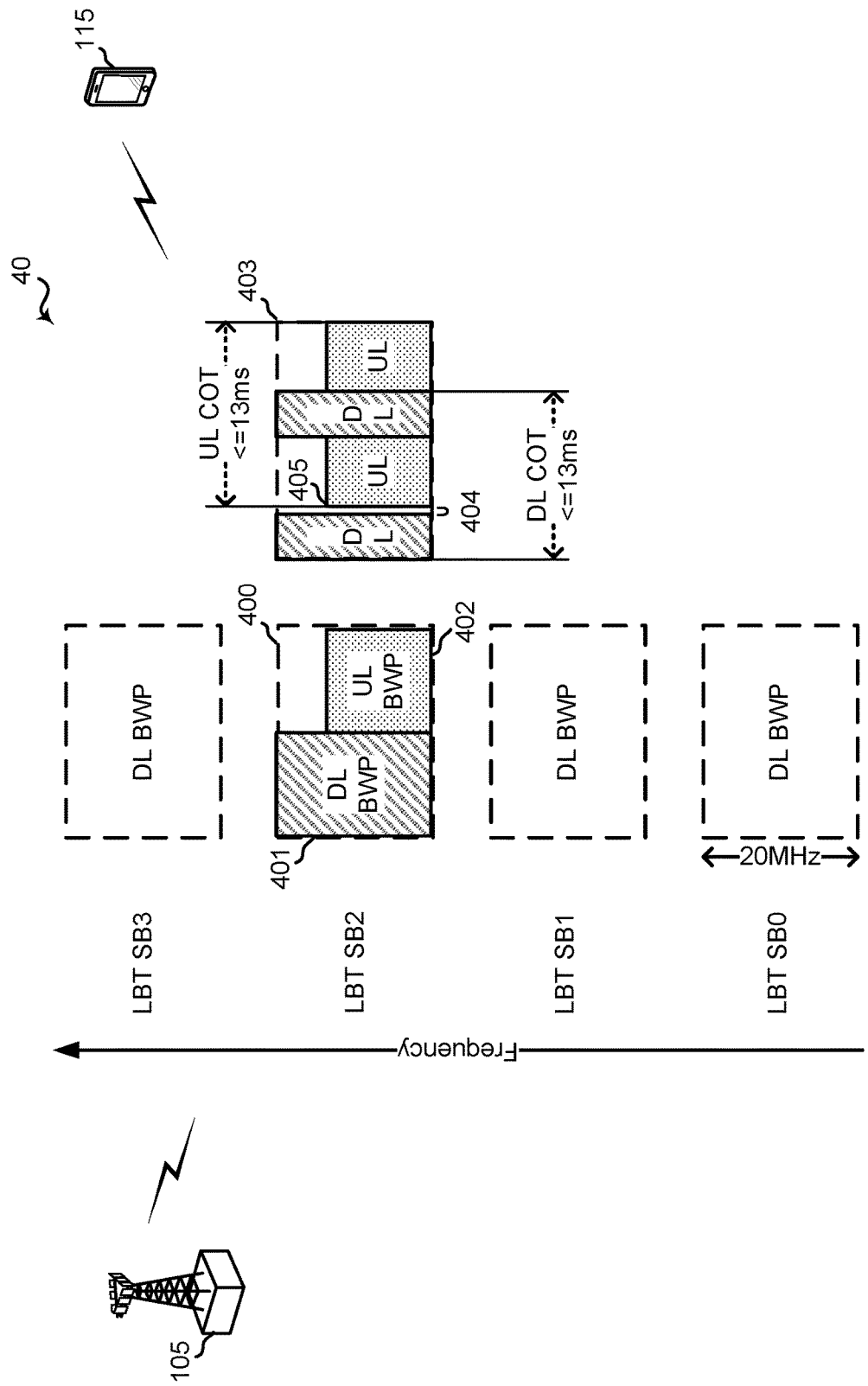
FIG. 4 is a block diagram illustrating a portion of a NR-U network, having a base station and UE configured according to one aspect of the present disclosure.

FIG. 4 is a block diagram illustrating a portion of NR-U network 40, having base station 105 and UE 115 configured according to one aspect of the present disclosure. For access in a different frequency band, the existing NR-U access designs may be applied in the different frequency band with a few changes that may comply with and exploit the various regulations identified for the different frequency band. As illustrated, the system bandwidth of NR-U network 40 may be divided into a number of LBT subbands, such as LBT SB0-SB3. Different BWPs may be configured for downlink and uplink transmissions. According to aspects of the present disclosure, base station 105 and UE 115 may operate similarly to LBE devices with updated CCA procedures. Within each transmission opportunity, such as transmission opportunity 400, downlink and uplink BWPs may be configured, such as downlink BWP 401 and uplink BWP 402 of varying frequency.

In the early portion of a given transmission opportunity, such as transmission opportunity 403 of LBT SB2, base station 105 and UE 115 each may perform a single-shot CCA (e.g., 18-μs LBT). Base station 105 may perform the single-shot CCA in the first downlink slot at the beginning of transmission opportunity 403, while UE 115 may perform the single-shot CCA in the downlink-to-uplink gap 404 at the beginning of the first uplink slot. If successful, multiple transmission allowed within transmission opportunity 403. Otherwise, either or both of base station 105 and UE 115 may continue to perform eCCAs until they clear the medium. An eCCA may typically have a random duration between the maximum of 18-μs and 0.2% of the COT duration for the lower bound, and 5% of the COT duration for the upper bound. Because base station 105 and UE 115 perform the CCA/eCCA procedure independently, both base station 105 and UE 115 perform the CCA/eCCA to acquire downlink COT and uplink COT for transmissions independently. In the illustrated aspect, the length of the downlink COT and uplink COT may be configured up to 13 ms. Once base station 105 and UE 115 each independently gain access to the shared spectrum of LBT SB2, multiple uplink/downlink switches may be allowed within transmission opportunity 403 without additional CCA procedure, as illustrated with the multiple downlink BWP and uplink BWP of transmission opportunity 403.

In some NR-U frequency bands, such as 5 GHz, multiple, non-overlapping 20 MHz LBT subbands may be configured. Such 5 GHz non-overlapping LBT subbands may be configured for downlink transmission or uplink transmissions. However, according to aspects of the present disclosure, NR-U network 40 may configure multiple, variable-sized downlink and uplink BWPs of up to 20 MHz within each of LBT subbands SB0-SB3. In some NR-U implementations, a UE, such as UE 115, may be configured to monitor for the downlink BWP in one LBT subband, such as LBT subband SB2, with its uplink BWP in the same LBT subband. In order to conserve power consumption, the transmission bandwidth of UE 115 may also be limited, such as to 5 MHz, 10 MHz, or the like for the uplink BWP. Additionally, if frequency hopping (FH) is configured for interference mitigation, dynamic BWP hopping across multiple LBT subbands can be used without necessity of compliance with a minimum number of FH frequencies.

In lower-band NR-U frequencies, such as the 2.4 GHz band (e.g., 2.4 GHz~2.4835 GHz), 13 or 14 WiFi channels may be designated with each channel having a 5 MHz channel spacing except for channel 14. WiFi nodes may occupy any of these channels. Two IEEE 802.11g standard access points may have two partially overlapping 20 MHz channels. Currently, NR-U LBT subbands are configured to be non-overlapping. However, NR-U standards do not require that such LBT subbands be non-overlapping. In fact, limiting LBT subbands to be non-overlapping may be wasteful of frequency resources.

Figure 5:
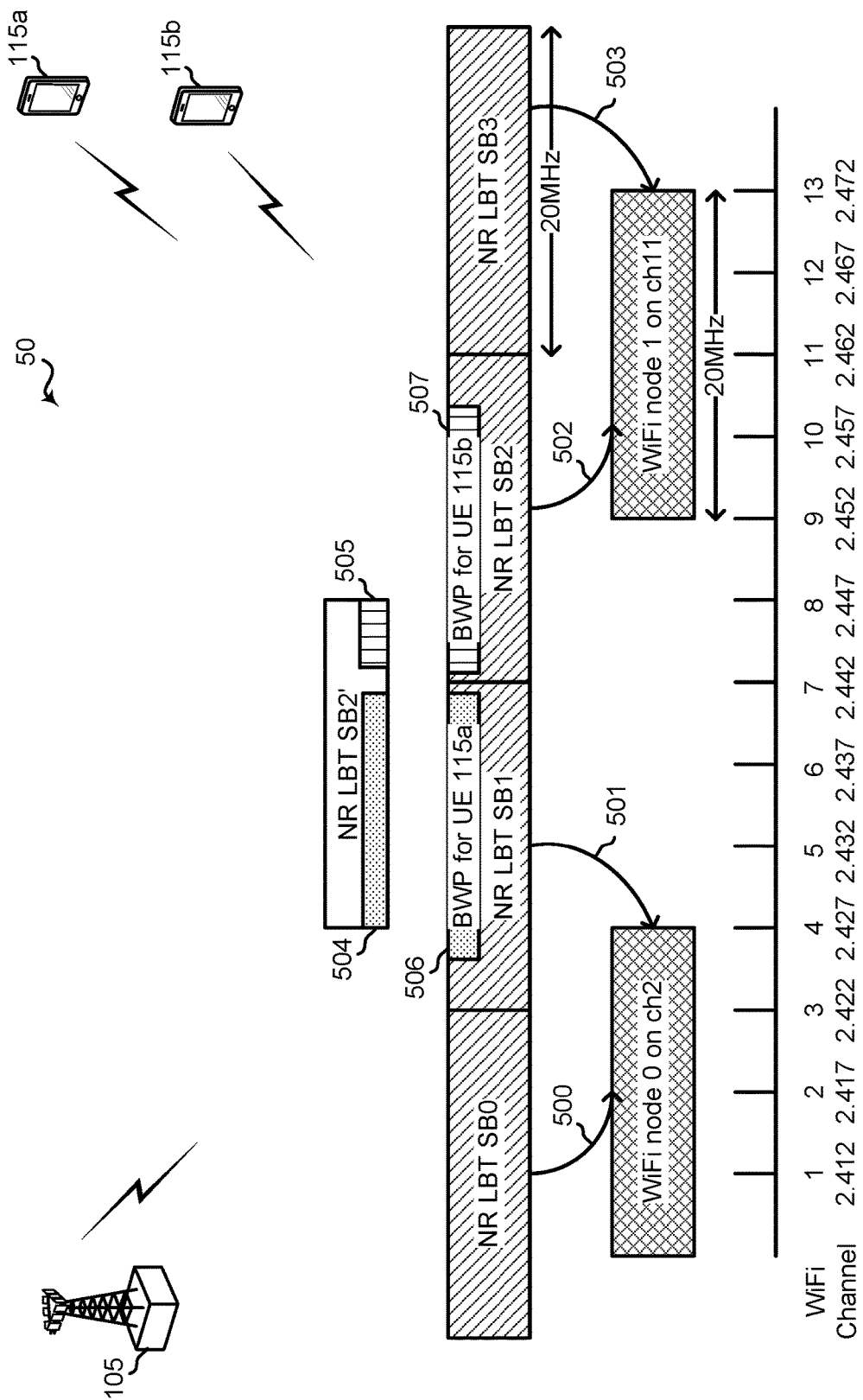
FIG. 5 is a block diagram illustrating another portion of a NR-U network, having a base station and UE configured according to one aspect of the present disclosure.

FIG. 5 is a block diagram illustrating a portion of NR-U network 50, having base station 105 and UE 115 configured according to one aspect of the present disclosure. NR-U network 50 includes 4 non-overlapping LBT subbands (SB0-SB3) which coexist in the same shared communication spectrum with two WiFi nodes (nodes 0 and 1) at channels 2 and 11. CCA procedures may fail in all four NR-U LBT subbands SB0-SB3 while the shared spectrum between 2.427~2.452 GHz are completely unoccupied. The CCA for LBT subband SB0 may be blocked at 500 by WiFi node 0 on channel 2. WiFi node 0 on channel 2 may also block the CCA for NR-U LBT subband SB1 at 501. Similarly, the CCA for NR-U LBT subband SB2 may be blocked at 502 by WiFi node 1 on channel 11, which may also block the CCA of NR-U LBT subband SB3 at 503. Additional aspects of the present disclosure are directed to allowing a base station, such as base station 105, to configure additional overlapping LBT subbands, such as NR-U LBT subband SB2'.

Configuration of such additional overlapping LBT subband (SB2') may avoid the WiFi blocking by WiFi nodes 0 and 1 at 500-503. When base station 105 successfully completes the CCA procedure in additional overlapping LBT subband SB2', base station 105 may be allowed to transmit in the physical resource blocks (PRBs) that overlap with NR-U LBT subbands SB1 and SB2 from one more BWPs. In one example implementation of the illustrated aspect, UE 115*a* is configured with BWP 506 in NR-U LBT subband SB1 and UE 115*b* is configured with BWP 507 in NR-U LBT subband SB2. Where base station 105 may fail the CCA in both LBT subbands SB1 and SB2, it may successfully complete the CCA on LBT subband SB2'. With a successful CCA in LBT subband SB2', base station 105 may schedule UEs 115*a* and 115*b* with the CORESETs that fall within LBT subband SB2' and schedule either or both of uplink and downlink transmissions in the PRBs that fall within LBT subband SB2'. Thus, base station 105 may schedule UE 115*a* with the CORESET covering 504 and then schedule uplink or downlink transmissions with UE 115a therein and may schedule UE 115b with the CORESET covering 505 and then schedule uplink or downlink transmissions with UE 115b therein.

In lower-band NR-U frequencies, such as the 2.4 GHz band, 13 WiFi channels have 5 MHz spacing and WiFi nodes are allowed to occupy any of the channels. ZIGBEE™, which is an IEEE 802.15.4-based wireless protocol, may have a 2 MHz bandwidth and 16 channels with channel spacing of 5 MHz. BLUETOOTH™ may have 79 channels or 40 channels in BLUETOOTH™ Low Energy (BLUETOOTH LE™) with 1 or 2 MHz spacing, respectively. Therefore, when devices from different technologies are deployed, the bandwidth of a clean channel within the shared communication spectrum may be much smaller than 20 MHz. In such scenarios, performing CCA on a full 20 MHz LBT subband for transmission on the small bandwidth of the clean channel may not be practical. While current discussion for NR-U operations contemplates a 20 MHz bandwidth for an LBT subband, smaller LBT bandwidths may be available as there is no blocking for NR-U as in WiFi operations. Because NR-U operations are generally based on energy detection and have no backward compatibility issues, as in WiFi, the smaller LBT/CCA bandwidth may have a better chance to pass when a large number of devices from different technology are sharing the same spectrum.

Figure 6:
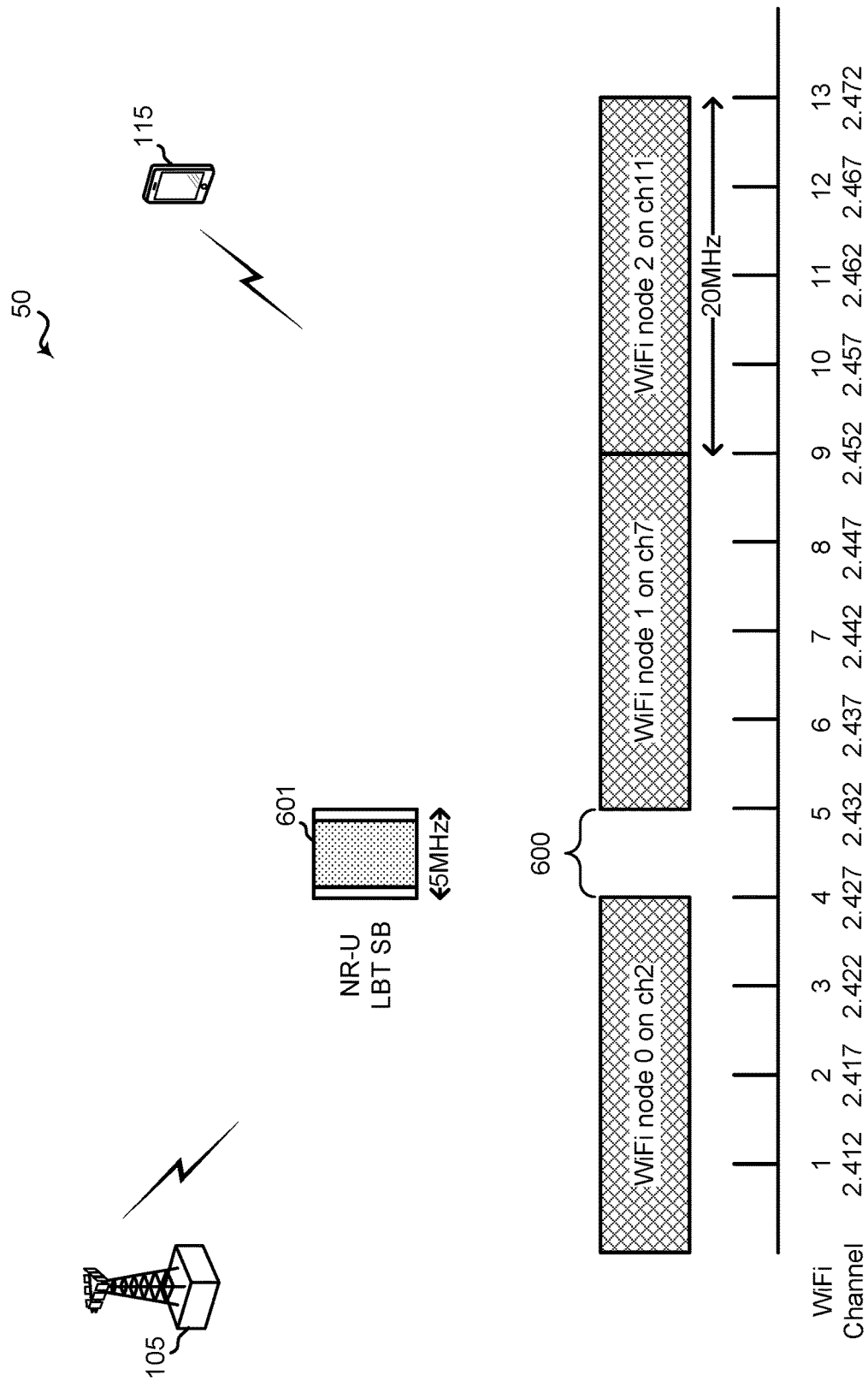
FIG. 6 is a block diagram illustrating another portion of a NR-U network, having a base station and UE configured according to one aspect of the present disclosure.

FIG. 6 is another block diagram illustrating a portion of NR-U network 50, having base station 105 and UE 115 configured according to one aspect of the present disclosure. According to the illustrated aspect, base station 105 or UE 115 may adjust the LBT subband bandwidth in accordance to the transmission bandwidth. In such example aspect, base station 105 senses the operations on the shared communication channel to determine or derive the bandwidth and frequency of a clean channel 600 within the shared communication spectrum. Base station 105 may monitor LBT uplink control indicator (UCI), determine subband channel state information (CSI), and the like, in order to determine the clean channel bandwidth. As illustrated, base station 105 detects interference or energy from WiFi nodes 0-2 on channels 2, 7, and 11, respectively, and determines clean channel 600 between channels 4 and 5. Using this information, base station 105 can schedule uplink and/or downlink traffic within clean channel 600.

Base station 105 may also allocate resources 601 (e.g., a CORESET or scheduled RBs) to send downlink control signals within clean channel 600. As illustrated, clean channel 600 may have a bandwidth less than 20 MHz. Either UE 115 or base station 105 may pick the smallest LBT subband size and frequency so that the LBT subband just covers the allocated resources 601 (e.g., CORESET or scheduled RBs). The smaller LBT subbands may have higher chance of passing the LBT/CCA procedure considering the other devices of other technologies competing for access to the shared spectrum.

Figure 7:
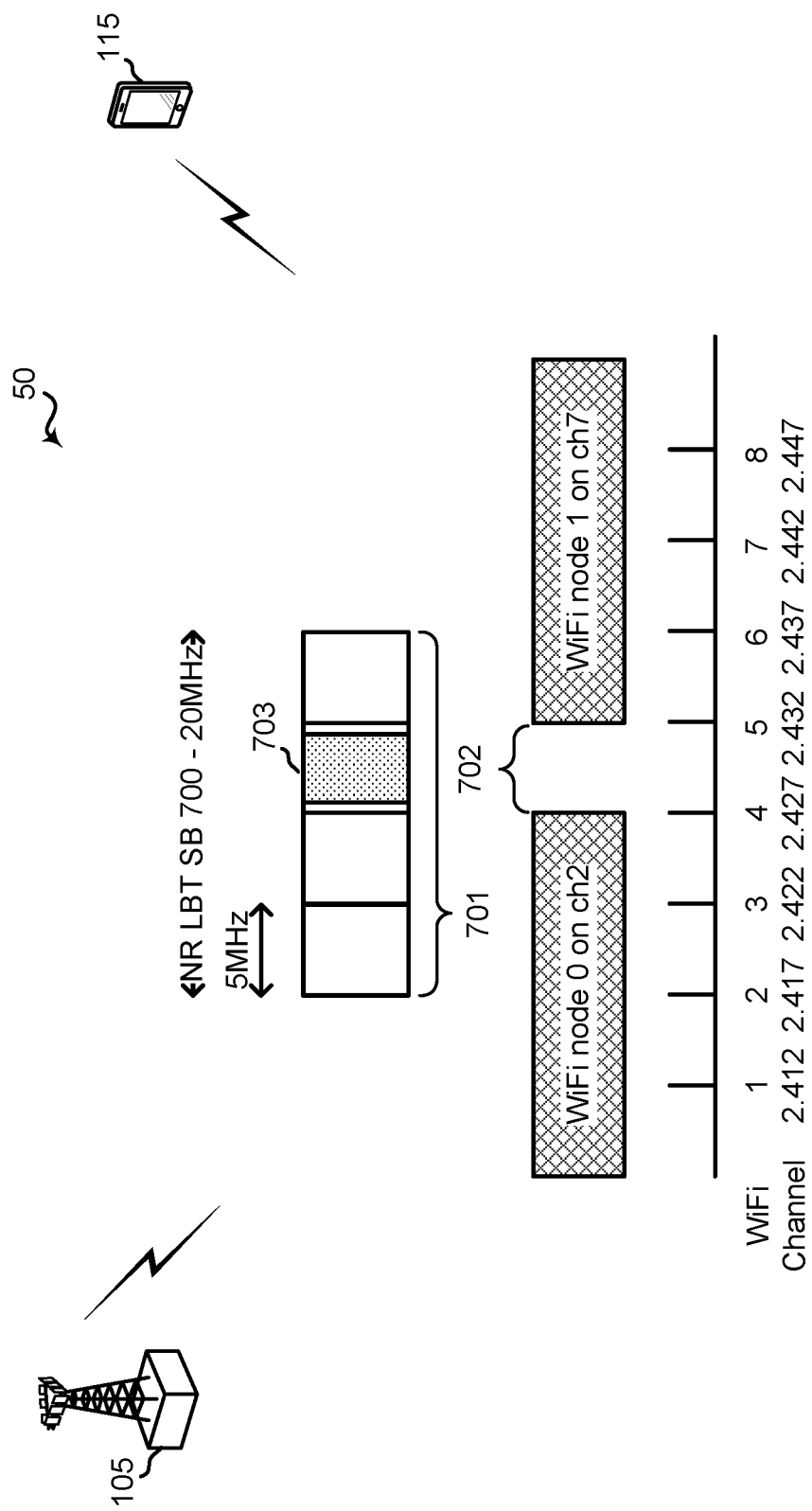
FIG. 7 is a block diagram illustrating another portion of a NR-U network, having a base station and UE configured according to one aspect of the present disclosure.

FIG. 7 is another block diagram illustrating a portion of NR-U network 50, having base station 105 and UE 115 configured according to one aspect of the present disclosure. In the illustrated aspect, NR LBT subband 700 (e.g. 20 MHz) may be partitioned into M overlapping or non-overlapping small LBT subbands 701. The network may configure M as a fixed number based on the particular characteristics of a given network deployment. CCA functionality may implemented on all M small LBT subbands 701 over the entire bandwidth of NR LBT subband 700. In such aspect, a UE that is capable of accessing one 20 MHz bandwidth may now have four small LBT subbands within that 20 MHz bandwidth. Before transmission, the UE such as UE 115, performs the CCA in each of the four small LBT subbands 701. UE 115 may not successfully complete the CCA in frequencies that conflict with WiFi node 0 on channel 2 and WiFi node 1 on channel 7. However, it may clear the CCA on small LBT subband 703 overlapping with the allocated PRBs independently. UE 115 may then be capable of transmitting on clear channel 702. Base station 105 may perform similarly by performing CCA in each of the M small LBT subbands 701 and transmitting in response to success of the CCA in small LBT subband 703, coinciding with clear channel 702. By increasing M, base station 105 and/or UE 115 may increase chances to successfully clear the CCA and transmit in available bandwidth. As M increases, it gives a better approximation to the ideal granularity of any available bandwidth.

Figure 8:
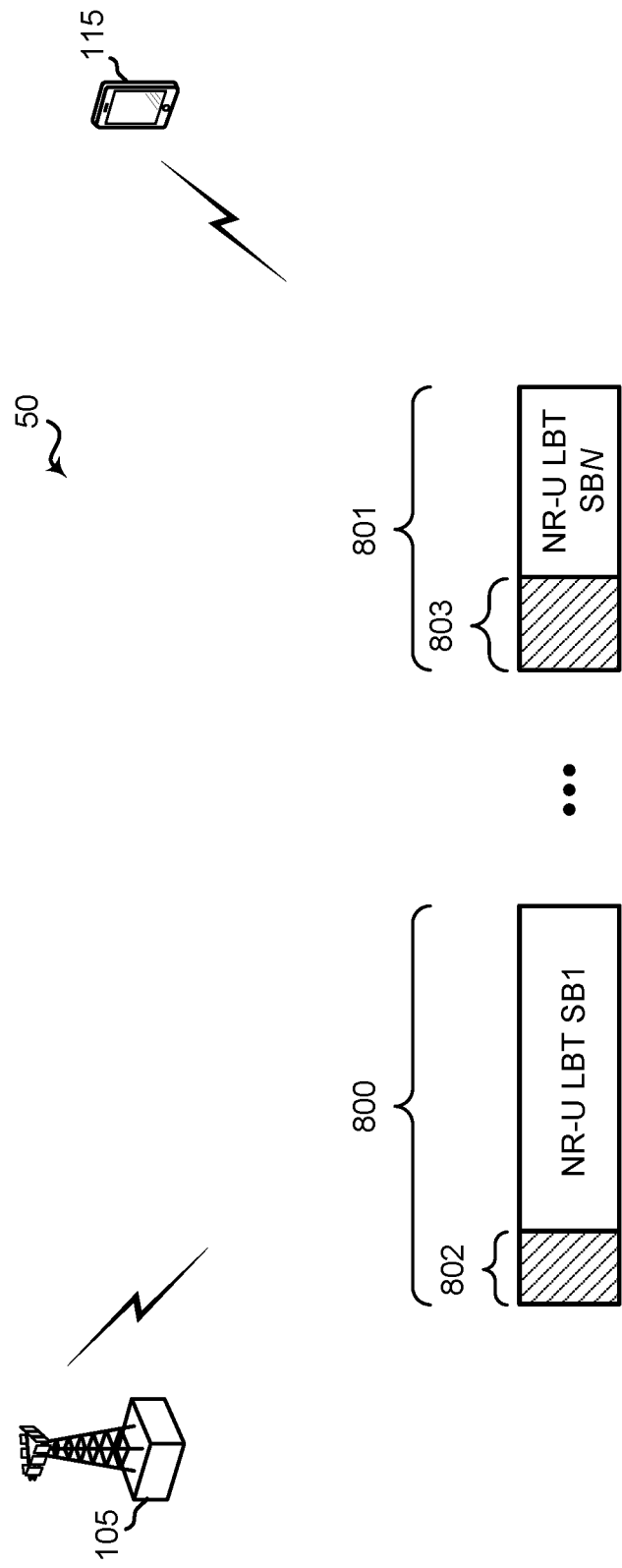
FIG. 8 is a block diagram illustrating another portion of a NR-U network, having a base station and UE configured according to one aspect of the present disclosure.

FIG. 8 is another block diagram illustrating a portion of NR-U network 50, having base station 105 and UE 115 configured according to one aspect of the present disclosure. When performing an eCCA procedure the procedure has a random duration of: R=Max(18 µs, 0.2% COT)~5% COT. A transmission having a smaller LBT bandwidth may have a better chance to successfully clear the eCCA when the interference is distributed uniformly in frequency. In certain scenarios, the lower bandwidth transmissions may have a higher priority in the network. To balance the packets of similar traffic priority transmitting in different transmission bandwidths, base station 105 and/or UE 115 may adjust the upper bound of the eCCA random window as a function of LBT bandwidth. Thus, the smaller LBT subband may have a longer random window size than the larger LBT subband with higher probability. For example, base station 105 and/or UE 115 may increase the upper bound of R (5% COT) by a factor which is inversely proportional to the LBT bandwidth.

In an example operation of the illustrated example, NR-U LBT subband SB1 has an LBT bandwidth 800. With the upper bound of R inversely proportional to LBT bandwidth 800, the eCCA random window may have a maximum size 802. This maximum size 802 may, because of the more standard bandwidth size of NR-U LBT subband SB1, may be approximately 5% of the COT. However, NR-U LBT subband SBN has an LBT bandwidth 801 less than LBT bandwidth 800. The smaller bandwidth of LBT bandwidth 801 results in an inversely proportional longer maximum eCCA window size 803. Such adjustments may be configured dynamically when necessary. Alternatively, base station 105 may know the proportioning change from the network configuration, from which UE 115 may infer from signaling from base station 105 in an uplink grant, medium access control-control element (MAC-CE), or radio resource control (RRC) signaling.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 3A and 3B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Aspects of the present disclosure may be implemented in various different ways and combinations. For example, a first example aspect of wireless communication may include performing, by a UE, an eCCA for a random eCCA duration on one or more LBT subbands of a system bandwidth defined within shared communication spectrum; and transmitting, by the UE, uplink transmissions on one or more uplink occasions scheduled within a COT of at least one LBT subband of the one or more LBT subbands, wherein the transmitting is in response to success of the eCCA in the at least one LBT subband.

A second example aspect, based on the first aspect, further including performing, by the UE, an abbreviated LBT procedure on the one or more LBT subbands, wherein the performing the eCCA is in response to failure of the abbreviated LBT procedure, and wherein the transmitting the uplink transmissions is further in response to success of the abbreviated LBT procedure.

A third example aspect, based on the first example aspect, further including receiving, by the UE, configuration of the one or more uplink occasions, wherein each uplink occasion of the one or more uplink occasions is configured with a bandwidth part less than or equal to 20 MHz.

A fourth example aspect, based on the third example aspect, wherein a size of the bandwidth part is selected to reduce power consumption at the UE.

A fifth example aspect, based on the first example aspect, further including receiving, by the UE, a schedule of one or more of the one or more uplink occasions within one or more physical resource blocks in the COT of at least one overlapping LBT subband of one or more overlapping LBT subbands overlapping at least one non-overlapping LBT subbands in which the one or more physical resource blocks falls, wherein the COT is initiated in response to success of the eCCA in the at least one overlapping LBT subband, and wherein the one or more LBT subbands includes a plurality of non-overlapping LBT subbands and the one or more overlapping LBT subbands, wherein the one or more overlapping LBT subbands overlap physical resource blocks which fall within a corresponding subband of the plurality of non-overlapping LBT subbands.

A sixth example aspect, based on the first example aspect, further including receiving, at the UE, a signal from a serving base station indicating a transmission bandwidth for the COT; adjusting, by the UE, a bandwidth of the one or more LBT subbands relative to the transmission bandwidth, wherein the adjusting includes reduction of the bandwidth in response to the transmission bandwidth less than a maximum LBT subband bandwidth.

A seventh example aspect, based on the sixth example aspect, wherein the signal includes one of an uplink grant allocating a set of resource blocks within the transmission bandwidth; or an identification of a CORESET within the transmission bandwidth.

An eighth example aspect, based on the seventh example aspect, wherein the adjusting further includes selecting a smallest LBT subband size and frequency to accommodate one of: the set of resource blocks allocated in the uplink grant or the CORESET.

A ninth example aspect, based on the first example aspect, further including partitioning, by the base station, each of the one or more LBT subbands into a predetermined number of small LBT subbands, wherein each of the predetermined number of small LBT subbands is configured for eCCA operation; and receiving, by the UE from a serving base station, a configuration of a partitioning of each of the one or more LBT subbands into a predetermined number of small LBT subbands, wherein the at least one LBT subband includes at least one of the predetermined number of small LBT subbands on which the eCCA is successful.

A tenth example aspect, based on the first example aspect, further including identifying, by the UE, a change to a bandwidth of the one or more LBT subbands; and adjusting, by the UE, an upper bound of a range from which the random eCCA duration is selected, wherein the adjusting is inversely proportional to a resulting bandwidth of the change to the bandwidth.

An eleventh example aspect of wireless communication may include performing, by a base station, an eCCA for a random eCCA duration on one or more LBT subbands of a system bandwidth defined within shared communication spectrum; scheduling, by the base station, one or more of one or more uplink occasions and one or more downlink occasions within a COT of at least one LBT subband of the one or more LBT subbands, wherein the COT is initiated in response to success of the eCCA in the at least one LBT subband; and transmitting, by the base station, downlink transmissions on the one or more downlink occasions.

A twelfth example aspect, based on the eleventh example aspect, further including performing, by the base station, an abbreviated LBT procedure on the one or more LBT subbands, wherein the performing the eCCA is in response to failure of the abbreviated LBT procedure, and wherein the transmitting the downlink transmissions is further in response to success of the abbreviated LBT procedure.

A thirteenth example aspect, based on the eleventh example aspect, further including configuring, by the base station, the one or more uplink occasions and the one or more downlink occasions with a bandwidth part less than or equal to 20 MHz; and signaling, by the base station, configuration information to one or more served UEs identifying the bandwidth part of the one or more uplink occasions.

A fourteenth example aspect, based on the thirteenth example aspect, wherein a size of the bandwidth part is selected to reduce power consumption at the one or more served UEs.

A fifteenth example aspect, based on the eleventh example aspect, wherein the one or more LBT subbands includes a plurality of non-overlapping LBT subbands and one or more overlapping LBT subbands, wherein the one or more overlapping LBT subbands overlap physical resource blocks which fall within a corresponding subband of the plurality of non-overlapping LBT subbands, and wherein the scheduling includes scheduling one or more of the one or more uplink occasions and one or more downlink occasions within one or more physical resource blocks in the COT of at least one overlapping LBT subband of the one or more overlapping LBT subbands overlapping at least one non-overlapping LBT subbands in which the one or more physical resource blocks falls, wherein the COT is initiated in response to success of the eCCA in the at least one overlapping LBT subband.

A sixteenth example aspect, based on the eleventh example aspect, further including sensing, by the base station, the system bandwidth for a clean channel of the shared communication spectrum; identifying, by the base station, a transmission bandwidth of the clean channel; transmitting, at the base station, a signal to the one or more served UEs indicating the transmission bandwidth for the COT; and adjusting, by the base station, a bandwidth of the one or more LBT subbands relative to the transmission bandwidth, wherein the adjusting includes reduction of the bandwidth in response to the transmission bandwidth less than a maximum LBT subband bandwidth.

A seventeenth example aspect, based on the sixteenth example aspect, wherein the signal includes one of an uplink grant allocating a set of resource blocks within the transmission bandwidth; or an identification of a CORESET within the transmission bandwidth.

An eighteenth example aspect, based on the seventeenth example aspect, wherein the adjusting further includes selecting a smallest LBT subband size and frequency to accommodate the transmission bandwidth.

A nineteenth example aspect, based on the eleventh example aspect, further including: partitioning, by the base station, each of the one or more LBT subbands into a predetermined number of small LBT subbands, wherein each of the predetermined number of small LBT subbands is configured for eCCA operation; and signaling, by the base station, a configuration of the predetermined number of small LBT subbands for the one or more LBT subbands to the one or more served UEs, wherein the at least one LBT subband includes at least one of the predetermined number of small LBT subbands on which the eCCA is successful.

A twentieth example aspect, based on the eleventh example aspect, further including identifying, by the base station, a change to a bandwidth of the one or more LBT subbands; adjusting, by the base station, an upper bound of a range from which the random eCCA duration is selected, wherein the adjusting is inversely proportional to a resulting bandwidth of the change to the bandwidth.

A twenty-first example aspect configured for wireless communication includes means for performing, by a UE, an eCCA for a random eCCA duration on one or more LBT subbands of a system bandwidth defined within shared communication spectrum; and means for transmitting, by the UE, uplink transmissions on one or more uplink occasions scheduled within a COT of at least one LBT subband of the one or more LBT subbands, wherein the transmitting is in response to success of the eCCA in the at least one LBT subband.

A twenty-second example aspect, based on the twenty-first example aspect, further including means for performing, by the UE, an abbreviated LBT procedure on the one or more LBT subbands, wherein the means for performing the eCCA is in response to failure of the abbreviated LBT procedure, and wherein the means for transmitting the uplink transmissions is further in response to success of the abbreviated LBT procedure.

A twenty-third example aspect, based on the twenty-first example aspect, further including means for receiving, by the UE, configuration of the one or more uplink occasions, wherein each uplink occasion of the one or more uplink occasions is configured with a bandwidth part less than or equal to 20 MHz.

A twenty-fourth example aspect, based on the twenty-third example aspect, wherein a size of the bandwidth part is selected to reduce power consumption at the UE.

A twenty-fifth example aspect, based on the twenty-first example aspect, further including means for receiving, by the UE, a schedule of one or more of the one or more uplink occasions within one or more physical resource blocks in the COT of at least one overlapping LBT subband of one or more overlapping LBT subbands overlapping at least one non-overlapping LBT subbands in which the one or more physical resource blocks falls, wherein the COT is initiated in response to success of the eCCA in the at least one overlapping LBT subband, and wherein the one or more LBT subbands includes a plurality of non-overlapping LBT subbands and the one or more overlapping LBT subbands, wherein the one or more overlapping LBT subbands overlap physical resource blocks which fall within a corresponding subband of the plurality of non-overlapping LBT subbands.

A twenty-sixth example aspect, based on the twenty-first example aspect, further including means for receiving, at the UE, a signal from a serving base station indicating a transmission bandwidth for the COT; means for adjusting, by the UE, a bandwidth of the one or more LBT subbands relative to the transmission bandwidth, wherein the means for adjusting includes reduction of the bandwidth in response to the transmission bandwidth less than a maximum LBT subband bandwidth.

A twenty-seventh example aspect, based on the twenty-sixth example aspect, wherein the signal includes one of an uplink grant allocating a set of resource blocks within the transmission bandwidth; or an identification of a CORESET within the transmission bandwidth.

A twenty-eighth example aspect, based on the twenty-seventh example aspect, wherein the means for adjusting further includes means for selecting a smallest LBT subband size and frequency to accommodate one of: the set of resource blocks allocated in the uplink grant or the CORESET.

A twenty-ninth example aspect, based on the twenty-first example aspect, further including means for partitioning, by the base station, each of the one or more LBT subbands into a predetermined number of small LBT subbands, wherein each of the predetermined number of small LBT subbands is configured for eCCA operation; and means for receiving, by the UE from a serving base station, a configuration of a partitioning of each of the one or more LBT subbands into a predetermined number of small LBT subbands, wherein the at least one LBT subband includes at least one of the predetermined number of small LBT subbands on which the eCCA is successful.

A thirtieth example aspect, based on the twenty-first example aspect, further including means for identifying, by the UE, a change to a bandwidth of the one or more LBT subbands; means for adjusting, by the UE, an upper bound of a range from which the random eCCA duration is selected, wherein the means for adjusting is inversely proportional to a resulting bandwidth of the change to the bandwidth.

A thirty-first example aspect configured for wireless communication may include means for performing, by a base station, an eCCA for a random eCCA duration on one or more LBT subbands of a system bandwidth defined within shared communication spectrum; means for scheduling, by the base station, one or more of one or more uplink occasions and one or more downlink occasions within a COT of at least one LBT subband of the one or more LBT subbands, wherein the COT is initiated in response to success of the eCCA in the at least one LBT subband; and means for transmitting, by the base station, downlink transmissions on the one or more downlink occasions.

A thirty-second example aspect, based on the thirty-first example aspect, further including means for performing, by the base station, an abbreviated LBT procedure on the one or more LBT subbands, wherein the means for performing the eCCA is in response to failure of the abbreviated LBT procedure, and wherein the means for transmitting the downlink transmissions is further in response to success of the abbreviated LBT procedure.

A thirty-third example aspect, based on the thirty-first example aspect, further including means for configuring, by the base station, the one or more uplink occasions and the one or more downlink occasions with a bandwidth part less than or equal to 20 MHz; and means for signaling, by the base station, configuration information to one or more served UEs identifying the bandwidth part of the one or more uplink occasions.

A thirty-fourth example aspect, based on the thirty-third example aspect, wherein a size of the bandwidth part is selected to reduce power consumption at the one or more served UEs.

A thirty-fifth example aspect, based on the thirty-first example aspect, wherein the one or more LBT subbands includes a plurality of non-overlapping LBT subbands and one or more overlapping LBT subbands, wherein the one or more overlapping LBT subbands overlap physical resource blocks which fall within a corresponding subband of the plurality of non-overlapping LBT subbands, and wherein the means for scheduling includes means for scheduling one or more of the one or more uplink occasions and one or more downlink occasions within one or more physical resource blocks in the COT of at least one overlapping LBT subband of the one or more overlapping LBT subbands overlapping at least one non-overlapping LBT subbands in which the one or more physical resource blocks falls, wherein the COT is initiated in response to success of the eCCA in the at least one overlapping LBT subband.

A thirty-sixth example aspect, based on the thirty-first example aspect, further including means for sensing, by the base station, the system bandwidth for a clean channel of the shared communication spectrum; means for identifying, by the base station, a transmission bandwidth of the clean channel; means for transmitting, at the base station, a signal to the one or more served UEs indicating the transmission bandwidth for the COT; and means for adjusting, by the base station, a bandwidth of the one or more LBT subbands relative to the transmission bandwidth, wherein the means for adjusting includes reduction of the bandwidth in response to the transmission bandwidth less than a maximum LBT subband bandwidth.

A thirty-seventh example aspect, based on the thrity-sixth example aspect, wherein the signal includes one of an uplink grant allocating a set of resource blocks within the transmission bandwidth; or an identification of a CORESET within the transmission bandwidth.

A thirty-eighth example aspect, based on the thirty-seventh example aspect, wherein the means for adjusting further includes means for selecting a smallest LBT subband size and frequency to accommodate the transmission bandwidth.

A thirty-ninth example aspect, based on the thirty-first example aspect, further including means for partitioning, by the base station, each of the one or more LBT subbands into a predetermined number of small LBT subbands, wherein each of the predetermined number of small LBT subbands is configured for eCCA operation; and means for signaling, by the base station, a configuration of the predetermined number of small LBT subbands for the one or more LBT subbands to the one or more served UEs, wherein the at least one LBT subband includes at least one of the predetermined number of small LBT subbands on which the eCCA is successful.

A fortieth example aspect, based on the thirty-first example aspect, further including means for identifying, by the base station, a change to a bandwidth of the one or more LBT subbands; and means for adjusting, by the base station, an upper bound of a range from which the random eCCA duration is selected, wherein the means for adjusting is inversely proportional to a resulting bandwidth of the change to the bandwidth.

A forty-first example aspect may include a non-transitory computer-readable medium having program code recorded thereon, where the program code may include program code executable by a computer for causing the computer to perform, by a UE, an eCCA for a random eCCA duration on one or more LBT subbands of a system bandwidth defined within shared communication spectrum; and program code executable by the computer for causing the computer to transmit, by the UE, uplink transmissions on one or more uplink occasions scheduled within a COT of at least one LBT subband of the one or more LBT subbands, wherein the transmitting is in response to success of the eCCA in the at least one LBT subband.

A forty-second example aspect, based on the forty-first example aspect, further including program code executable by the computer for causing the computer to perform, by the UE, an abbreviated LBT procedure on the one or more LBT subbands, wherein the program code executable by the computer for causing the computer to perform the eCCA is executed in response to failure of the abbreviated LBT procedure, and wherein the program code executable by the computer for causing the computer to transmit the uplink transmissions is further executed in response to success of the abbreviated LBT procedure.

A forty-third example aspect, based on the forty-first example aspect, further including program code executable by the computer for causing the computer to receive, by the UE, configuration of the one or more uplink occasions, wherein each uplink occasion of the one or more uplink occasions is configured with a bandwidth part less than or equal to 20 MHz.

A forty-fourth example aspect, based on the forty-third example aspect, wherein a size of the bandwidth part is selected to reduce power consumption at the UE.

A forty-fourth example aspect, based on the forty-first example aspect, further including program code executable by the computer for causing the computer to receive, by the UE, a schedule of one or more of the one or more uplink occasions within one or more physical resource blocks in the COT of at least one overlapping LBT subband of one or more overlapping LBT subbands overlapping at least one non-overlapping LBT subbands in which the one or more physical resource blocks falls, wherein the COT is initiated in response to success of the eCCA in the at least one overlapping LBT subband, and wherein the one or more LBT subbands includes a plurality of non-overlapping LBT subbands and the one or more overlapping LBT subbands, wherein the one or more overlapping LBT subbands overlap physical resource blocks which fall within a corresponding subband of the plurality of non-overlapping LBT subbands.

A forty-sixth example aspect, based on the forty-first example aspect, further including program code executable by the computer for causing the computer to receive, at the UE, a signal from a serving base station indicating a transmission bandwidth for the COT; and program code executable by the computer for causing the computer to adjust, by the UE, a bandwidth of the one or more LBT subbands relative to the transmission bandwidth, wherein the program code executable by the computer for causing the computer to adjust includes reduction of the bandwidth in response to the transmission bandwidth less than a maximum LBT subband bandwidth.

A forty-seventh example aspect, based on the forty-sixth example aspect, wherein the signal includes one of an uplink grant allocating a set of resource blocks within the transmission bandwidth; or an identification of a CORESET within the transmission bandwidth.

A forty-eighth example aspect, based on the forty-seventh example aspect, wherein the program code executable by the computer for causing the computer to adjust further includes program code executable by the computer for causing the computer to select a smallest LBT subband size and frequency to accommodate one of: the set of resource blocks allocated in the uplink grant or the CORESET.

A forty-ninth example aspect, based on the forty-first example aspect, further including program code executable by the computer for causing the computer to partition, by the base station, each of the one or more LBT subbands into a predetermined number of small LBT subbands, wherein each of the predetermined number of small LBT subbands is configured for eCCA operation; and program code executable by the computer for causing the computer to receive, by the UE from a serving base station, a configuration of a partitioning of each of the one or more LBT subbands into a predetermined number of small LBT subbands, wherein the at least one LBT subband includes at least one of the predetermined number of small LBT subbands on which the eCCA is successful.

A fiftieth example aspect, based on the forty-first example aspect, further including program code executable by the computer for causing the computer to identify, by the UE, a change to a bandwidth of the one or more LBT subbands; program code executable by the computer for causing the computer to adjust, by the UE, an upper bound of a range from which the random eCCA duration is selected, wherein the program code executable by the computer for causing the computer to adjust is inversely proportional to a resulting bandwidth of the change to the bandwidth.

A fifty-first example aspect includes a non-transitory computer-readable medium having program code recorded thereon, where the program code may include program code executable by a computer for causing the computer to perform, by a base station, an eCCA for a random eCCA duration on one or more LBT subbands of a system bandwidth defined within shared communication spectrum; program code executable by the computer for causing the computer to schedule, by the base station, one or more of one or more uplink occasions and one or more downlink occasions within a COT of at least one LBT subband of the one or more LBT subbands, wherein the COT is initiated in response to success of the eCCA in the at least one LBT subband; and program code executable by the computer for causing the computer to transmit, by the base station, downlink transmissions on the one or more downlink occasions.

A fifty-second example aspect, based on the fifty-first example aspect, further including program code executable by the computer for causing the computer to perform, by the base station, an abbreviated LBT procedure on the one or more LBT subbands, wherein the program code executable by the computer for causing the computer to perform the eCCA is executed in response to failure of the abbreviated LBT procedure, and wherein the program code executable by the computer for causing the computer to transmit the downlink transmissions is further executed in response to success of the abbreviated LBT procedure.

A fifty-third example aspect, based on the fifty-first example aspect, further including program code executable by the computer for causing the computer to configure, by the base station, the one or more uplink occasions and the one or more downlink occasions with a bandwidth part less than or equal to 20 MHz; and program code executable by the computer for causing the computer to signal, by the base station, configuration information to one or more served UEs identifying the bandwidth part of the one or more uplink occasions.

A fifty-fourth example aspect, based on the fifty-third example aspect, wherein a size of the bandwidth part is selected to reduce power consumption at the one or more served UEs.

A fifty-fifth example aspect, based on the fifty-first example aspect, wherein the one or more LBT subbands includes a plurality of non-overlapping LBT subbands and one or more overlapping LBT subbands, wherein the one or more overlapping LBT subbands overlap physical resource blocks which fall within a corresponding subband of the plurality of non-overlapping LBT subbands, and wherein the program code executable by the computer for causing the computer to schedule includes program code executable by the computer for causing the computer to schedule one or more of the one or more uplink occasions and one or more downlink occasions within one or more physical resource blocks in the COT of at least one overlapping LBT subband of the one or more overlapping LBT subbands overlapping at least one non-overlapping LBT subbands in which the one or more physical resource blocks falls, wherein the COT is initiated in response to success of the eCCA in the at least one overlapping LBT subband.

A fifty-sixth example aspect, based on the fifty-first example aspect, further including program code executable by the computer for causing the computer to sense, by the base station, the system bandwidth for a clean channel of the shared communication spectrum; program code executable by the computer for causing the computer to identify, by the base station, a transmission bandwidth of the clean channel; program code executable by the computer for causing the computer to transmit, at the base station, a signal to the one or more served UEs indicating the transmission bandwidth for the COT; and program code executable by the computer for causing the computer to adjust, by the base station, a bandwidth of the one or more LBT subbands relative to the transmission bandwidth, wherein the program code executable by the computer for causing the computer to adjust includes reduction of the bandwidth in response to the transmission bandwidth less than a maximum LBT subband bandwidth.

A fifty-seventh example aspect, based on the fifty-sixth example aspect, wherein the signal includes one of an uplink grant allocating a set of resource blocks within the transmission bandwidth; or an identification of a CORESET within the transmission bandwidth.

A fifty-eighth example aspect, based on the fifty-seventh example aspect, wherein the program code executable by the computer for causing the computer to adjust further includes program code executable by the computer for causing the computer to select a smallest LBT subband size and frequency to accommodate the transmission bandwidth.

A fifty-ninth example aspect, based on the fifty-first example aspect, further including program code executable by the computer for causing the computer to partition, by the base station, each of the one or more LBT subbands into a predetermined number of small LBT subbands, wherein each of the predetermined number of small LBT subbands is configured for eCCA operation; and program code executable by the computer for causing the computer to signal, by the base station, a configuration of the predetermined number of small LBT subbands for the one or more LBT subbands to the one or more served UEs, wherein the at least one LBT subband includes at least one of the predetermined number of small LBT subbands on which the eCCA is successful.

A sixtieth example aspect, based on the fifty-first example aspect, further including program code executable by the computer for causing the computer to identify, by the base station, a change to a bandwidth of the one or more LBT subbands; and program code executable by the computer for causing the computer to adjust, by the base station, an upper bound of a range from which the random eCCA duration is selected, wherein the program code executable by the computer for causing the computer to adjust is inversely proportional to a resulting bandwidth of the change to the bandwidth.

A sixty-first example aspect configured for wireless communication may include at least one processor; and a memory coupled to the at least one processor, wherein the at least one processor may be configured to perform, by a UE, an eCCA for a random eCCA duration on one or more LBT subbands of a system bandwidth defined within shared communication spectrum; and to transmit, by the UE, uplink transmissions on one or more uplink occasions scheduled within a COT of at least one LBT subband of the one or more LBT subbands, wherein the transmitting is in response to success of the eCCA in the at least one LBT subband.

A sixty-second example aspect, based on the sixty-first example aspect, further including configuration of the at least one processor to perform, by the UE, an abbreviated LBT procedure on the one or more LBT subbands, wherein the configuration of the at least one processor to perform the eCCA is executed in response to failure of the abbreviated LBT procedure, and wherein the configuration of the at least one processor to transmit the uplink transmissions is further executed in response to success of the abbreviated LBT procedure.

A sixty-third example aspect, based on the sixty-first example aspect, further including configuration of the at least one processor to receive, by the UE, configuration of the one or more uplink occasions, wherein each uplink occasion of the one or more uplink occasions is configured with a bandwidth part less than or equal to 20 MHz.

A sixty-fourth example aspect, based on the sixty-third example aspect, wherein a size of the bandwidth part is selected to reduce power consumption at the UE.

A sixty-fifth example aspect, based on the sixty-first example aspect, further including configuration of the at least one processor to receive, by the UE, a schedule of one or more of the one or more uplink occasions within one or more physical resource blocks in the COT of at least one overlapping LBT subband of one or more overlapping LBT subbands overlapping at least one non-overlapping LBT subbands in which the one or more physical resource blocks falls, wherein the COT is initiated in response to success of the eCCA in the at least one overlapping LBT subband, and wherein the one or more LBT subbands includes a plurality of non-overlapping LBT subbands and the one or more overlapping LBT subbands, wherein the one or more overlapping LBT subbands overlap physical resource blocks which fall within a corresponding subband of the plurality of non-overlapping LBT subbands.

A sixty-sixth example aspect, based on the sixty-first example aspect, further including configuration of the at least one processor to receive, at the UE, a signal from a serving base station indicating a transmission bandwidth for the COT; to adjust, by the UE, a bandwidth of the one or more LBT subbands relative to the transmission bandwidth, wherein the configuration of the at least one processor to adjust includes reduction of the bandwidth in response to the transmission bandwidth less than a maximum LBT subband bandwidth.

A sixty-seventh example aspect, based on the sixty-sixth example aspect, wherein the signal includes one of an uplink grant allocating a set of resource blocks within the transmission bandwidth; or an identification of a CORESET within the transmission bandwidth.

A sixty-eighth example aspect, based on the sixty-seventh example aspect, wherein the configuration of the at least one processor to adjust further configuration of the at least one processor to select a smallest LBT subband size and frequency to accommodate one of: the set of resource blocks allocated in the uplink grant or the CORESET.

A sixty-ninth example aspect, based on the sixty-first example aspect, further including configuration of the at least one processor to partition, by the base station, each of the one or more LBT subbands into a predetermined number of small LBT subbands, wherein each of the predetermined number of small LBT subbands is configured for eCCA operation; and to receive, by the UE from a serving base station, a configuration of a partitioning of each of the one or more LBT subbands into a predetermined number of small LBT subbands, wherein the at least one LBT subband includes at least one of the predetermined number of small LBT subbands on which the eCCA is successful.

A seventieth example aspect, based on the sixty-first example aspect, further including configuration of the at least one processor to identify, by the UE, a change to a bandwidth of the one or more LBT subbands; and to adjust, by the UE, an upper bound of a range from which the random eCCA duration is selected, wherein the configuration of the at least one processor to adjust is inversely proportional to a resulting bandwidth of the change to the bandwidth.

A seventy-first example aspect configured for wireless communication may include at least one processor; and a memory coupled to the at least one processor, wherein the at least one processor is configured to perform, by a base station, an eCCA for a random eCCA duration on one or more LBT subbands of a system bandwidth defined within shared communication spectrum; to schedule, by the base station, one or more of one or more uplink occasions and one or more downlink occasions within a COT of at least one LBT subband of the one or more LBT subbands, wherein the COT is initiated in response to success of the eCCA in the at least one LBT subband; and to transmit, by the base station, downlink transmissions on the one or more downlink occasions.

A seventy-second example aspect, based on the seventy-first example aspect, further including configuration of the at least one processor to perform, by the base station, an abbreviated LBT procedure on the one or more LBT subbands, wherein the configuration of the at least one processor to perform the eCCA is executed in response to failure of the abbreviated LBT procedure, and wherein the configuration of the at least one processor to transmit the downlink transmissions is further executed in response to success of the abbreviated LBT procedure.

A seventy-third example aspect, based on the seventy-first example aspect, further including configuration of the at least one processor to configure, by the base station, the one or more uplink occasions and the one or more downlink occasions with a bandwidth part less than or equal to 20 MHz; and to signal, by the base station, configuration information to one or more served UEs identifying the bandwidth part of the one or more uplink occasions.

A seventy-fourth example aspect, based on the seventy-third example aspect, wherein a size of the bandwidth part is selected to reduce power consumption at the one or more served UEs.

A seventy-fifth example aspect, based on the seventy-first example aspect, wherein the one or more LBT subbands includes a plurality of non-overlapping LBT subbands and one or more overlapping LBT subbands, wherein the one or more overlapping LBT subbands overlap physical resource blocks which fall within a corresponding subband of the plurality of non-overlapping LBT subbands, and wherein the configuration of the at least one processor to schedule includes configuration of the at least one processor to schedule one or more of the one or more uplink occasions and one or more downlink occasions within one or more physical resource blocks in the COT of at least one overlapping LBT subband of the one or more overlapping LBT subbands overlapping at least one non-overlapping LBT subbands in which the one or more physical resource blocks falls, wherein the COT is initiated in response to success of the eCCA in the at least one overlapping LBT subband.

A seventy-sixth example aspect, based on the seventy-first example aspect, further including configuration of the at least one processor to sense, by the base station, the system bandwidth for a clean channel of the shared communication spectrum; to identify, by the base station, a transmission bandwidth of the clean channel; to transmit, at the base station, a signal to the one or more served UEs indicating the transmission bandwidth for the COT; and to adjust, by the base station, a bandwidth of the one or more LBT subbands relative to the transmission bandwidth, wherein the configuration of the at least one processor to adjust includes reduction of the bandwidth in response to the transmission bandwidth less than a maximum LBT subband bandwidth.

A seventy-seventh example aspect, based on the seventy-sixth example aspect, wherein the signal includes one of an uplink grant allocating a set of resource blocks within the transmission bandwidth; or an identification of a CORESET within the transmission bandwidth.

A seventy-eighth example aspect, based on the seventy-seventh example aspect, wherein the configuration of the at least one processor to adjust further includes configuration of the at least one processor to select a smallest LBT subband size and frequency to accommodate the transmission bandwidth.

A seventy-ninth example aspect, based on the seventy-first example aspect, further including configuration of the at least one processor to partition, by the base station, each of the one or more LBT subbands into a predetermined number of small LBT subbands, wherein each of the predetermined number of small LBT subbands is configured for eCCA operation; and to signal, by the base station, a configuration of the predetermined number of small LBT subbands for the one or more LBT subbands to the one or more served UEs, wherein the at least one LBT subband includes at least one of the predetermined number of small LBT subbands on which the eCCA is successful.

An eightieth example aspect, based on the seventy-first example aspect, further including configuration of the at least one processor to identify, by the base station, a change to a bandwidth of the one or more LBT subbands; and to adjust, by the base station, an upper bound of a range from which the random eCCA duration is selected, wherein the configuration of the at least one processor to adjust is inversely proportional to a resulting bandwidth of the change to the bandwidth.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication, comprising:
performing, by a user equipment (UE), an extended clear channel assessment (eCCA) for a random eCCA duration on one or more listen before talk (LBT) subbands of a system bandwidth defined within a shared communication spectrum, wherein performing the eCCA for the random eCCA duration on the one or more LBT subbands includes adjusting, by the UE, an upper bound of a range from which the random eCCA duration is selected, the adjusting based on a change to a bandwidth of the one or more LBT subbands; and
transmitting, by the UE, uplink transmissions on one or more uplink occasions scheduled within a channel occupancy time (COT) of at least one LBT subband of the one or more LBT subbands, wherein the transmitting is in response to success of the eCCA in the at least one LBT subband.

2. The method of claim 1, further including:
performing, by the UE, an abbreviated listen before talk (LBT) procedure on the one or more LBT subbands, wherein the performing the eCCA is in response to failure of the abbreviated LBT procedure, and wherein the transmitting the uplink transmissions is further in response to success of the abbreviated LBT procedure.

3. The method of claim 1, further including:
receiving, by the UE, configuration of the one or more uplink occasions, wherein each uplink occasion of the one or more uplink occasions is configured with a bandwidth part less than or equal to 20 MHz.

4. The method of claim 3, wherein a size of the bandwidth part is selected to reduce power consumption at the UE.

5. The method of claim 1, further including:
receiving, by the UE, a schedule of one or more of the one or more uplink occasions within one or more physical resource blocks in the COT of at least one overlapping LBT subband of one or more overlapping LBT subbands overlapping at least one non-overlapping LBT subbands in which the one or more physical resource blocks falls,
wherein the COT is initiated in response to success of the eCCA in the at least one overlapping LBT subband, and
wherein the one or more LBT subbands includes a plurality of non-overlapping LBT subbands and the one or more overlapping LBT subbands, wherein the one or more overlapping LBT subbands overlap physical resource blocks which fall within a corresponding subband of the plurality of non-overlapping LBT subbands.

6. The method of claim 1, further including:
receiving, at the UE, a signal from a serving base station indicating a transmission bandwidth for the COT;
adjusting, by the UE, a bandwidth of the one or more LBT subbands relative to the transmission bandwidth, wherein the adjusting includes reduction of the bandwidth in response to the transmission bandwidth less than a maximum LBT subband bandwidth.

7. The method of claim 6, wherein the signal includes one of:
an uplink grant allocating a set of resource blocks within the transmission bandwidth; or
an identification of a control resource set (CORESET) within the transmission bandwidth.

8. The method of claim 7, wherein the adjusting further includes:
selecting a smallest LBT subband size and frequency to accommodate one of: the set of resource blocks allocated in the uplink grant or the CORESET.

9. The method of claim 1, further including:
partitioning, by a base station, each of the one or more LBT subbands into a predetermined number of small LBT subbands, wherein each of the predetermined number of small LBT subbands is configured for eCCA operation; and
receiving, by the UE from the base station, a configuration of a partitioning of each of the one or more LBT subbands into the predetermined number of small LBT subbands, wherein the at least one LBT subband includes at least one of the predetermined number of small LBT subbands on which the eCCA is successful.

10. The method of claim 1, further including:
identifying, by the UE, a change to a bandwidth of the one or more LBT subbands;
wherein the adjusting is inversely proportional to a resulting bandwidth of the change to the bandwidth.

11. A method of wireless communication, comprising:
performing, by a base station, an extended clear channel assessment (eCCA) for a random eCCA duration on one or more listen before talk (LBT) subbands of a system bandwidth defined within shared communication spectrum, wherein performing the eCCA for the random eCCA duration on the one or more LBT subbands includes adjusting, by the base station, an upper bound of a range from which the random eCCA duration is selected, the adjusting based on a change to a bandwidth of the one or more LBT subbands;
scheduling, by the base station, one or more of one or more uplink occasions and one or more downlink occasions within a channel occupancy time (COT) of at least one LBT subband of the one or more LBT subbands, wherein the COT is initiated in response to success of the eCCA in the at least one LBT subband; and transmitting, by the base station, downlink transmissions on the one or more downlink occasions.

12. The method of claim 11, further including:

performing, by the base station, an abbreviated listen before talk (LBT) procedure on the one or more LBT subbands, wherein the performing the eCCA is in response to failure of the abbreviated LBT procedure, and wherein the transmitting the downlink transmissions is further in response to success of the abbreviated LBT procedure.

13. The method of claim 11, further including:

configuring, by the base station, the one or more uplink occasions and the one or more downlink occasions with a bandwidth part less than or equal to 20 MHz; and signaling, by the base station, configuration information to one or more served user equipments (UEs) identifying the bandwidth part of the one or more uplink occasions.

14. The method of claim 13, wherein a size of the bandwidth part is selected to reduce power consumption at the one or more served UEs.

15. The method of claim 11, wherein the one or more LBT subbands includes a plurality of non-overlapping LBT subbands and one or more overlapping LBT subbands, wherein the one or more overlapping LBT subbands overlap physical resource blocks which fall within a corresponding subband of the plurality of non-overlapping LBT subbands, and wherein the scheduling includes scheduling one or more of the one or more uplink occasions and one or more downlink occasions within one or more physical resource blocks in the COT of at least one overlapping LBT subband of the one or more overlapping LBT subbands overlapping at least one non-overlapping LBT subbands in which the one or more physical resource blocks falls, wherein the COT is initiated in response to success of the eCCA in the at least one overlapping LBT subband.

16. The method of claim 11, further including:

sensing, by the base station, the system bandwidth for a clean channel of the shared communication spectrum;

identifying, by the base station, a transmission bandwidth of the clean channel;

transmitting, at the base station, a signal to one or more served UEs indicating the transmission bandwidth for the COT; and adjusting, by the base station, a bandwidth of the one or more LBT subbands relative to the transmission bandwidth, wherein the adjusting includes reduction of the bandwidth in response to the transmission bandwidth less than a maximum LBT subband bandwidth.

17. The method of claim 16, wherein the signal includes one of:

an uplink grant allocating a set of resource blocks within the transmission bandwidth; or an identification of a control resource set (CORESET) within the transmission bandwidth.

18. The method of claim 17, wherein the adjusting further includes:

selecting a smallest LBT subband size and frequency to accommodate the transmission bandwidth.

19. The method of claim 11, further including:

partitioning, by the base station, each of the one or more LBT subbands into a predetermined number of small LBT subbands, wherein each of the predetermined number of small LBT subbands is configured for eCCA operation; and signaling, by the base station, a configuration of the predetermined number of small LBT subbands for the one or more LBT subbands to one or more served UEs, wherein the at least one LBT subband includes at least one of the predetermined number of small LBT subbands on which the eCCA is successful.

20. The method of claim 11, further including:

identifying, by the base station, a change to a bandwidth of the one or more LBT subbands, wherein the adjusting is inversely proportional to a resulting bandwidth of the change to the bandwidth.

21. An apparatus configured for wireless communication, comprising:

means for performing, by a user equipment (UE), an extended clear channel assessment (eCCA) for a random eCCA duration on one or more listen before talk (LBT) subbands of a system bandwidth defined within a shared communication spectrum, wherein the means for performing the eCCA for the random eCCA duration on the one or more LBT subbands includes means for adjusting, by the UE, an upper bound of a range from which the random eCCA duration is selected, the adjusting based on a change to a bandwidth of the one or more LBT subbands; and means for transmitting, by the UE, uplink transmissions on one or more uplink occasions scheduled within a channel occupancy time (COT) of at least one LBT subband of the one or more LBT subbands, wherein the transmitting is in response to success of the eCCA in the at least one LBT subband.

22. The apparatus of claim 21, further including:

means for performing, by the UE, an abbreviated listen before talk (LBT) procedure on the one or more LBT subbands, wherein the means for performing the eCCA is in response to failure of the abbreviated LBT procedure, and wherein the means for transmitting the uplink transmissions is further in response to success of the abbreviated LBT procedure.

23. The apparatus of claim 21, further including:

means for receiving, by the UE, configuration of the one or more uplink occasions, wherein each uplink occasion of the one or more uplink occasions is configured with a bandwidth part less than or equal to 20 MHz.

24. The apparatus of claim 23, wherein a size of the bandwidth part is selected to reduce power consumption at the UE.

25. The apparatus of claim 21, further including:

means for receiving, by the UE, a schedule of one or more of the one or more uplink occasions within one or more physical resource blocks in the COT of at least one overlapping LBT subband of one or more overlapping LBT subbands overlapping at least one non-overlapping LBT subbands in which the one or more physical resource blocks falls, wherein the COT is initiated in response to success of the eCCA in the at least one overlapping LBT subband, and wherein the one or more LBT subbands includes a plurality of non-overlapping LBT subbands and the one or more overlapping LBT subbands, wherein the one or more overlapping LBT subbands overlap physical resource blocks which fall within a corresponding subband of the plurality of non-overlapping LBT subbands.

26. The apparatus of claim 21, further including:
means for receiving, at the UE, a signal from a serving base station indicating a transmission bandwidth for the COT;
means for adjusting, by the UE, a bandwidth of the one or more LBT subbands relative to the transmission bandwidth, wherein the means for adjusting includes reduction of the bandwidth in response to the transmission bandwidth less than a maximum LBT subband bandwidth.

27. The apparatus of claim 26, wherein the signal includes one of:
an uplink grant allocating a set of resource blocks within the transmission bandwidth; or
an identification of a control resource set (CORESET) within the transmission bandwidth.

28. The apparatus of claim 27, wherein the means for adjusting further includes:
means for selecting a smallest LBT subband size and frequency to accommodate one of: the set of resource blocks allocated in the uplink grant or the CORESET.

29. The apparatus of claim 21, further including:
means for partitioning, by a base station, each of the one or more LBT subbands into a predetermined number of small LBT subbands, wherein each of the predetermined number of small LBT subbands is configured for eCCA operation; and
means for receiving, by the UE from the base station, a configuration of a partitioning of each of the one or more LBT subbands into the predetermined number of small LBT subbands, wherein the at least one LBT subband includes at least one of the predetermined number of small LBT subbands on which the eCCA is successful.

30. The apparatus of claim 21, further including:
means for identifying, by the UE, a change to a bandwidth of the one or more LBT subbands,
wherein the means for adjusting is inversely proportional to a resulting bandwidth of the change to the bandwidth.

31. An apparatus configured for wireless communication, comprising:
means for performing, by a base station, an extended clear channel assessment (eCCA) for a random eCCA duration on one or more listen before talk (LBT) subbands of a system bandwidth defined within shared communication spectrum, wherein the means for performing the eCCA for the random eCCA duration on the one or more LBT subbands includes means for adjusting, by the base station, an upper bound of a range from which the random eCCA duration is selected, the adjusting based on a change to a bandwidth of the one or more LBT subbands;
means for scheduling, by the base station, one or more of one or more uplink occasions and one or more downlink occasions within a channel occupancy time (COT) of at least one LBT subband of the one or more LBT subbands, wherein the COT is initiated in response to success of the eCCA in the at least one LBT subband; and
means for transmitting, by the base station, downlink transmissions on the one or more downlink occasions.

32. The apparatus of claim 31, further including:
means for performing, by the base station, an abbreviated listen before talk (LBT) procedure on the one or more LBT subbands, wherein the means for performing the eCCA is in response to failure of the abbreviated LBT procedure, and wherein the means for transmitting the downlink transmissions is further in response to success of the abbreviated LBT procedure.

33. The apparatus of claim 31, further including:
means for configuring, by the base station, the one or more uplink occasions and the one or more downlink occasions with a bandwidth part less than or equal to 20 MHz; and
means for signaling, by the base station, configuration information to one or more served user equipments (UEs) identifying the bandwidth part of the one or more uplink occasions.

34. The apparatus of claim 33, wherein a size of the bandwidth part is selected to reduce power consumption at the one or more served UEs.

35. The apparatus of claim 31,
wherein the one or more LBT subbands includes a plurality of non-overlapping LBT subbands and one or more overlapping LBT subbands, wherein the one or more overlapping LBT subbands overlap physical resource blocks which fall within a corresponding subband of the plurality of non-overlapping LBT subbands, and
wherein the means for scheduling includes means for scheduling one or more of the one or more uplink occasions and one or more downlink occasions within one or more physical resource blocks in the COT of at least one overlapping LBT subband of the one or more overlapping LBT subbands overlapping at least one non-overlapping LBT subbands in which the one or more physical resource blocks falls, wherein the COT is initiated in response to success of the eCCA in the at least one overlapping LBT subband.

36. The apparatus of claim 31, further including:
means for sensing, by the base station, the system bandwidth for a clean channel of the shared communication spectrum;
means for identifying, by the base station, a transmission bandwidth of the clean channel;
means for transmitting, at the base station, a signal to one or more served UEs indicating the transmission bandwidth for the COT; and
means for adjusting, by the base station, a bandwidth of the one or more LBT subbands relative to the transmission bandwidth, wherein the means for adjusting includes reduction of the bandwidth in response to the transmission bandwidth less than a maximum LBT subband bandwidth.

37. The apparatus of claim 36, wherein the signal includes one of:
an uplink grant allocating a set of resource blocks within the transmission bandwidth; or
an identification of a control resource set (CORESET) within the transmission bandwidth.

38. The apparatus of claim 37, wherein the means for adjusting further includes:
means for selecting a smallest LBT subband size and frequency to accommodate the transmission bandwidth.

39. The apparatus of claim 31, further including:
means for partitioning, by the base station, each of the one or more LBT subbands into a predetermined number of small LBT subbands, wherein each of the predetermined number of small LBT subbands is configured for eCCA operation; and means for signaling, by the base station, a configuration of the predetermined number of small LBT subbands for the one or more LBT subbands to one or more served UEs, wherein the at least one LBT subband includes at least one of the predetermined number of small LBT subbands on which the eCCA is successful.

40. The apparatus of claim 31, further including:

means for identifying, by the base station, a change to a bandwidth of the one or more LBT subbands, wherein the means for adjusting is inversely proportional to a resulting bandwidth of the change to the bandwidth.

41. A non-transitory computer-readable medium having program code recorded thereon, the program code comprising:

program code executable by a computer for causing the computer to perform, by a user equipment (UE), an extended clear channel assessment (eCCA) for a random eCCA duration on one or more listen before talk (LBT) subbands of a system bandwidth defined within a shared communication spectrum, wherein the program code executable by the computer for causing the computer to perform the eCCA for the random eCCA duration on the one or more LBT subbands includes the program code executable by the computer for causing the computer to adjust, by the UE, an upper bound of a range from which the random eCCA duration is selected, the adjustment based on a change to a bandwidth of the one or more LBT subbands; and program code executable by the computer for causing the computer to transmit, by the UE, uplink transmissions on one or more uplink occasions scheduled within a channel occupancy time (COT) of at least one LBT subband of the one or more LBT subbands, wherein the transmitting is in response to success of the eCCA in the at least one LBT subband.

42. The non-transitory computer-readable medium of claim 41, further including:

program code executable by the computer for causing the computer to perform, by the UE, an abbreviated listen before talk (LBT) procedure on the one or more LBT subbands, wherein the program code executable by the computer for causing the computer to perform the eCCA is executed in response to failure of the abbreviated LBT procedure, and wherein the program code executable by the computer for causing the computer to transmit the uplink transmissions is further executed in response to success of the abbreviated LBT procedure.

43. The non-transitory computer-readable medium of claim 41, further including:

program code executable by the computer for causing the computer to receive, by the UE, configuration of the one or more uplink occasions, wherein each uplink occasion of the one or more uplink occasions is configured with a bandwidth part less than or equal to 20 MHz.

44. The non-transitory computer-readable medium of claim 43, wherein a size of the bandwidth part is selected to reduce power consumption at the UE.

45. The non-transitory computer-readable medium of claim 41, further including:

program code executable by the computer for causing the computer to receive, by the UE, a schedule of one or more of the one or more uplink occasions within one or more physical resource blocks in the COT of at least one overlapping LBT subband of one or more overlapping LBT subbands overlapping at least one non-overlapping LBT subbands in which the one or more physical resource blocks falls, wherein the COT is initiated in response to success of the eCCA in the at least one overlapping LBT subband, and wherein the one or more LBT subbands includes a plurality of non-overlapping LBT subbands and the one or more overlapping LBT subbands, wherein the one or more overlapping LBT subbands overlap physical resource blocks which fall within a corresponding subband of the plurality of non-overlapping LBT subbands.

46. The non-transitory computer-readable medium of claim 41, further including:

program code executable by the computer for causing the computer to receive, at the UE, a signal from a serving base station indicating a transmission bandwidth for the COT;

program code executable by the computer for causing the computer to adjust, by the UE, a bandwidth of the one or more LBT subbands relative to the transmission bandwidth, wherein the program code executable by the computer for causing the computer to adjust includes reduction of the bandwidth in response to the transmission bandwidth less than a maximum LBT subband bandwidth.

47. The non-transitory computer-readable medium of claim 46, wherein the signal includes one of:

an uplink grant allocating a set of resource blocks within the transmission bandwidth; or an identification of a control resource set (CORESET) within the transmission bandwidth.

48. The non-transitory computer-readable medium of claim 47, wherein the program code executable by the computer for causing the computer to adjust further includes:

program code executable by the computer for causing the computer to select a smallest LBT subband size and frequency to accommodate one of: the set of resource blocks allocated in the uplink grant or the CORESET.

49. The non-transitory computer-readable medium of claim 41, further including:

program code executable by the computer for causing the computer to partition, by a base station, each of the one or more LBT subbands into a predetermined number of small LBT subbands, wherein each of the predetermined number of small LBT subbands is configured for eCCA operation; and program code executable by the computer for causing the computer to receive, by the UE from the base station, a configuration of a partitioning of each of the one or more LBT subbands into the predetermined number of small LBT subbands, wherein the at least one LBT subband includes at least one of the predetermined number of small LBT subbands on which the eCCA is successful.

50. The non-transitory computer-readable medium of claim 41, further including:

program code executable by the computer for causing the computer to identify, by the UE, a change to a bandwidth of the one or more LBT subbands, wherein the program code executable by the computer for causing the computer to adjust is inversely proportional to a resulting bandwidth of the change to the bandwidth.

51. A non-transitory computer-readable medium having program code recorded thereon, the program code comprising:
program code executable by a computer for causing the computer to perform, by a base station, an extended clear channel assessment (eCCA) for a random eCCA duration on one or more listen before talk (LBT) subbands of a system bandwidth defined within shared communication spectrum, wherein the program code executable by the computer for causing the computer to perform the eCCA for the random eCCA duration on the one or more LBT subbands includes the program code executable by the computer for causing the computer to adjust, by the base station, an upper bound of a range from which the random eCCA duration is selected, the adjustment based on a change to a bandwidth of the one or more LBT subbands;
program code executable by the computer for causing the computer to schedule, by the base station, one or more of one or more uplink occasions and one or more downlink occasions within a channel occupancy time (COT) of at least one LBT subband of the one or more LBT subbands, wherein the COT is initiated in response to success of the eCCA in the at least one LBT subband; and
program code executable by the computer for causing the computer to transmit, by the base station, downlink transmissions on the one or more downlink occasions.

52. The non-transitory computer-readable medium of claim 51, further including:
program code executable by the computer for causing the computer to perform, by the base station, an abbreviated listen before talk (LBT) procedure on the one or more LBT subbands, wherein the program code executable by the computer for causing the computer to perform the eCCA is executed in response to failure of the abbreviated LBT procedure, and wherein the program code executable by the computer for causing the computer to transmit the downlink transmissions is further executed in response to success of the abbreviated LBT procedure.

53. The non-transitory computer-readable medium of claim 51, further including:
program code executable by the computer for causing the computer to configure, by the base station, the one or more uplink occasions and the one or more downlink occasions with a bandwidth part less than or equal to 20 MHz; and
program code executable by the computer for causing the computer to signal, by the base station, configuration information to one or more served user equipments (UEs) identifying the bandwidth part of the one or more uplink occasions.

54. The non-transitory computer-readable medium of claim 53, wherein a size of the bandwidth part is selected to reduce power consumption at the one or more served UEs.

55. The non-transitory computer-readable medium of claim 51,
wherein the one or more LBT subbands includes a plurality of non-overlapping LBT subbands and one or more overlapping LBT subbands, wherein the one or more overlapping LBT subbands overlap physical resource blocks which fall within a corresponding subband of the plurality of non-overlapping LBT subbands, and
wherein the program code executable by the computer for causing the computer to schedule includes program code executable by the computer for causing the computer to schedule one or more of the one or more uplink occasions and one or more downlink occasions within one or more physical resource blocks in the COT of at least one overlapping LBT subband of the one or more overlapping LBT subbands overlapping at least one non-overlapping LBT subbands in which the one or more physical resource blocks falls, wherein the COT is initiated in response to success of the eCCA in the at least one overlapping LBT subband.

56. The non-transitory computer-readable medium of claim 51, further including:
program code executable by the computer for causing the computer to sense, by the base station, the system bandwidth for a clean channel of the shared communication spectrum;
program code executable by the computer for causing the computer to identify, by the base station, a transmission bandwidth of the clean channel;
program code executable by the computer for causing the computer to transmit, at the base station, a signal to one or more served UEs indicating the transmission bandwidth for the COT; and
program code executable by the computer for causing the computer to adjust, by the base station, a bandwidth of the one or more LBT subbands relative to the transmission bandwidth, wherein the program code executable by the computer for causing the computer to adjust includes reduction of the bandwidth in response to the transmission bandwidth less than a maximum LBT subband bandwidth.

57. The non-transitory computer-readable medium of claim 56, wherein the signal includes one of:
an uplink grant allocating a set of resource blocks within the transmission bandwidth; or
an identification of a control resource set (CORESET) within the transmission bandwidth.

58. The non-transitory computer-readable medium of claim 57, wherein the program code executable by the computer for causing the computer to adjust further includes:
program code executable by the computer for causing the computer to select a smallest LBT subband size and frequency to accommodate the transmission bandwidth.

59. The non-transitory computer-readable medium of claim 51, further including:
program code executable by the computer for causing the computer to partition, by the base station, each of the one or more LBT subbands into a predetermined number of small LBT subbands, wherein each of the predetermined number of small LBT subbands is configured for eCCA operation; and
program code executable by the computer for causing the computer to signal, by the base station, a configuration of the predetermined number of small LBT subbands for the one or more LBT subbands to one or more served UEs, wherein the at least one LBT subband includes at least one of the predetermined number of small LBT subbands on which the eCCA is successful.

60. The non-transitory computer-readable medium of claim 51, further including:

program code executable by the computer for causing the computer to identify, by the base station, a change to a bandwidth of the one or more LBT subbands, wherein the program code executable by the computer for causing the computer to adjust is inversely proportional to a resulting bandwidth of the change to the bandwidth.

61. An apparatus configured for wireless communication, the apparatus comprising:

at least one processor; and a memory coupled to the at least one processor, wherein the at least one processor is configured:

to perform, by a user equipment (UE), an extended clear channel assessment (eCCA) for a random eCCA duration on one or more listen before talk (LBT) subbands of a system bandwidth defined within a shared communication spectrum, wherein the at least one processor configured to perform the eCCA for the random eCCA duration on the one or more LBT subbands includes the least one processor further configured to adjust, by the UE, an upper bound of a range from which the random eCCA duration is selected, the adjustment based on a change to a bandwidth of the one or more LBT subbands; and to transmit, by the UE, uplink transmissions on one or more uplink occasions scheduled within a channel occupancy time (COT) of at least one LBT subband of the one or more LBT subbands, wherein the transmitting is in response to success of the eCCA in the at least one LBT subband.

62. The apparatus of claim 61, further including configuration of the at least one processor:

to perform, by the UE, an abbreviated listen before talk (LBT) procedure on the one or more LBT subbands, wherein the configuration of the at least one processor to perform the eCCA is executed in response to failure of the abbreviated LBT procedure, and wherein the configuration of the at least one processor to transmit the uplink transmissions is further executed in response to success of the abbreviated LBT procedure.

63. The apparatus of claim 61, further including configuration of the at least one processor to receive, by the UE, configuration of the one or more uplink occasions, wherein each uplink occasion of the one or more uplink occasions is configured with a bandwidth part less than or equal to 20 MHz.

64. The apparatus of claim 63, wherein a size of the bandwidth part is selected to reduce power consumption at the UE.

65. The apparatus of claim 61, further including configuration of the at least one processor:

to receive, by the UE, a schedule of one or more of the one or more uplink occasions within one or more physical resource blocks in the COT of at least one overlapping LBT subband of one or more overlapping LBT subbands overlapping at least one non-overlapping LBT subbands in which the one or more physical resource blocks falls, wherein the COT is initiated in response to success of the eCCA in the at least one overlapping LBT subband, and wherein the one or more LBT subbands includes a plurality of non-overlapping LBT subbands and the one or more overlapping LBT subbands, wherein the one or more overlapping LBT subbands overlap physical resource blocks which fall within a corresponding subband of the plurality of non-overlapping LBT subbands.

66. The apparatus of claim 61, further including configuration of the at least one processor:

to receive, at the UE, a signal from a serving base station indicating a transmission bandwidth for the COT;

to adjust, by the UE, a bandwidth of the one or more LBT subbands relative to the transmission bandwidth, wherein the configuration of the at least one processor to adjust includes reduction of the bandwidth in response to the transmission bandwidth less than a maximum LBT subband bandwidth.

67. The apparatus of claim 66, wherein the signal includes one of:

an uplink grant allocating a set of resource blocks within the transmission bandwidth; or an identification of a control resource set (CORESET) within the transmission bandwidth.

68. The apparatus of claim 67, wherein the configuration of the at least one processor to adjust further configuration of the at least one processor to select a smallest LBT subband size and frequency to accommodate one of: the set of resource blocks allocated in the uplink grant or the CORESET.

69. The apparatus of claim 61, further including configuration of the at least one processor:

to partition, by a base station, each of the one or more LBT subbands into a predetermined number of small LBT subbands, wherein each of the predetermined number of small LBT subbands is configured for eCCA operation; and to receive, by the UE from the base station, a configuration of a partitioning of each of the one or more LBT subbands into the predetermined number of small LBT subbands, wherein the at least one LBT subband includes at least one of the predetermined number of small LBT subbands on which the eCCA is successful.

70. The apparatus of claim 61, further including configuration of the at least one processor:

to identify, by the UE, a change to a bandwidth of the one or more LBT subbands, wherein the configuration of the at least one processor to adjust is inversely proportional to a resulting bandwidth of the change to the bandwidth.

71. An apparatus configured for wireless communication, the apparatus comprising:

at least one processor; and a memory coupled to the at least one processor, wherein the at least one processor is configured:

to perform, by a base station, an extended clear channel assessment (eCCA) for a random eCCA duration on one or more listen before talk (LBT) subbands of a system bandwidth defined within shared communication spectrum, wherein the at least one processor configured to perform the eCCA for the random eCCA duration on the one or more LBT subbands includes the least one processor further configured to adjust, by the base station, an upper bound of a range from which the random eCCA duration is selected, the adjustment based on a change to a bandwidth of the one or more LBT subbands;

to schedule, by the base station, one or more of one or more uplink occasions and one or more downlink occasions within a channel occupancy time (COT) of at least one LBT subband of the one or more LBT subbands, wherein the COT is initiated in response to success of the eCCA in the at least one LBT subband; and to transmit, by the base station, downlink transmissions on the one or more downlink occasions.

72. The apparatus of claim 71, further including configuration of the at least one processor:

to perform, by the base station, an abbreviated listen before talk (LBT) procedure on the one or more LBT subbands, wherein the configuration of the at least one processor to perform the eCCA is executed in response to failure of the abbreviated LBT procedure, and wherein the configuration of the at least one processor to transmit the downlink transmissions is further executed in response to success of the abbreviated LBT procedure.

73. The apparatus of claim 71, further including configuration of the at least one processor:

to configure, by the base station, the one or more uplink occasions and the one or more downlink occasions with a bandwidth part less than or equal to 20 MHz; and to signal, by the base station, configuration information to one or more served user equipments (UEs) identifying the bandwidth part of the one or more uplink occasions.

74. The apparatus of claim 73, wherein a size of the bandwidth part is selected to reduce power consumption at the one or more served UEs.

75. The apparatus of claim 71, wherein the one or more LBT subbands includes a plurality of non-overlapping LBT subbands and one or more overlapping LBT subbands, wherein the one or more overlapping LBT subbands overlap physical resource blocks which fall within a corresponding subband of the plurality of non-overlapping LBT subbands, and wherein the configuration of the at least one processor to schedule includes configuration of the at least one processor to schedule one or more of the one or more uplink occasions and one or more downlink occasions within one or more physical resource blocks in the COT of at least one overlapping LBT subband of the one or more overlapping LBT subbands overlapping at least one non-overlapping LBT subbands in which the one or more physical resource blocks falls, wherein the COT is initiated in response to success of the eCCA in the at least one overlapping LBT subband.

76. The apparatus of claim 71, further including configuration of the at least one processor:

to sense, by the base station, the system bandwidth for a clean channel of the shared communication spectrum;

to identify, by the base station, a transmission bandwidth of the clean channel;

to transmit, at the base station, a signal to one or more served UEs indicating the transmission bandwidth for the COT; and to adjust, by the base station, a bandwidth of the one or more LBT subbands relative to the transmission bandwidth, wherein the configuration of the at least one processor to adjust includes reduction of the bandwidth in response to the transmission bandwidth less than a maximum LBT subband bandwidth.

77. The apparatus of claim 76, wherein the signal includes one of:

an uplink grant allocating a set of resource blocks within the transmission bandwidth; or an identification of a control resource set (CORESET) within the transmission bandwidth.

78. The apparatus of claim 77, wherein the configuration of the at least one processor to adjust further includes configuration of the at least one processor to select a smallest LBT subband size and frequency to accommodate the transmission bandwidth.

79. The apparatus of claim 71, further including configuration of the at least one processor:

to partition, by the base station, each of the one or more LBT subbands into a predetermined number of small LBT subbands, wherein each of the predetermined number of small LBT subbands is configured for eCCA operation; and to signal, by the base station, a configuration of the predetermined number of small LBT subbands for the one or more LBT subbands to one or more served UEs, wherein the at least one LBT subband includes at least one of the predetermined number of small LBT subbands on which the eCCA is successful.

80. The apparatus of claim 71, further including configuration of the at least one processor:

to identify, by the base station, a change to a bandwidth of the one or more LBT subbands, wherein the configuration of the at least one processor to adjust is inversely proportional to a resulting bandwidth of the change to the bandwidth.

* * * * *